United States Patent
Patti et al.

(10) Patent No.: US 12,271,287 B2
(45) Date of Patent: Apr. 8, 2025

(54) METHOD AND SYSTEM FOR RECOMMENDING RUNBOOKS FOR DETECTED EVENTS

(71) Applicant: Oracle International Corporation, Redwood Shores, CA (US)

(72) Inventors: Raghu Hanumanth Reddy Patti, San Bruno, CA (US); Christopher A. Roy, Amherst, NH (US); Ana Maria Hernandez McCollum, Belmont, CA (US); Manas Goswami, San Ramon, CA (US); Janet Kay Kolko, Golden, CO (US); Sreenivas Reddy, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 153 days.

(21) Appl. No.: 17/725,116

(22) Filed: Apr. 20, 2022

(65) Prior Publication Data

US 2023/0064625 A1 Mar. 2, 2023

Related U.S. Application Data

(60) Provisional application No. 63/261,832, filed on Sep. 29, 2021, provisional application No. 63/236,563,
(Continued)

(51) Int. Cl.
*G06F 9/44* (2018.01)
*G06F 11/07* (2006.01)
(Continued)

(52) U.S. Cl.
CPC ........ *G06F 11/3636* (2013.01); *G06F 11/079* (2013.01); *G06F 11/0793* (2013.01);
(Continued)

(58) Field of Classification Search
CPC ................................................... G06F 11/3636
(Continued)

(56) References Cited

U.S. PATENT DOCUMENTS

| 1,167,760 | A | * | 1/1916 | Shahbaz | ............... B21F 15/04 |
| | | | | | 269/103 |
| 8,533,608 | B1 | | 9/2013 | Tantiprasut | |

(Continued)

FOREIGN PATENT DOCUMENTS

WO 2015/065356 A1 5/2015

OTHER PUBLICATIONS

"Assigning System Center Orchestrator Runbooks Permissions", Retrieved at https://docs.flexera.com/appportal2017/Content/helplibrary/AP_ConnectMSOrch.htm, Retrieved on May 2022, 2 Pages.

(Continued)

*Primary Examiner* — Evral E Bodden
(74) *Attorney, Agent, or Firm* — Invoke

(57) ABSTRACT

Techniques for selecting a runbook to recommend for remediating a detected event are disclosed. When a system detects an event, the system obtains metadata associated with the event. The metadata provides information about the event and a system topology of the system in which the event occurred. The system generates a recommendation for a runbook to remediate the event based on one or both of characteristics of the event and characteristics of the topology in which the event occurred. The system compares a system topology to system topologies associated with previously-executed runbooks. The system recommends one of the previously-executed runbooks to remediate a detected event based on determining that the topology associated with the previously-executed runbook is similar to the topology of the system in which the event occurred.

21 Claims, 10 Drawing Sheets

Related U.S. Application Data filed on Aug. 24, 2021, provisional application No. 63/236,561, filed on Aug. 24, 2021, provisional application No. 63/236,557, filed on Aug. 24, 2021, provisional application No. 63/236,565, filed on Aug. 24, 2021.

(51) Int. Cl.
  *G06F 11/30* (2006.01)
  *G06F 11/34* (2006.01)
  *G06F 11/362* (2025.01)
  *G06Q 10/0631* (2023.01)
  *G06Q 10/0633* (2023.01)
  *G06Q 10/0637* (2023.01)
  *G06Q 10/10* (2023.01)
  *G06Q 10/20* (2023.01)
  *H04L 43/02* (2022.01)
  *H04L 67/00* (2022.01)
  *H04L 67/50* (2022.01)

(52) U.S. Cl.
  CPC ...... *G06F 11/3051* (2013.01); *G06F 11/3065* (2013.01); *G06F 11/3438* (2013.01); *G06F 11/3466* (2013.01); *G06F 11/3495* (2013.01); *G06F 11/366* (2013.01); *G06Q 10/06316* (2013.01); *G06Q 10/0633* (2013.01); *G06Q 10/0637* (2013.01); *G06Q 10/103* (2013.01); *G06Q 10/20* (2013.01); *H04L 43/02* (2013.01); *G06F 2201/86* (2013.01); *H04L 67/00* (2013.01); *H04L 67/535* (2022.05)

(58) Field of Classification Search
  USPC .......................................................... 717/128
  See application file for complete search history.

(56) References Cited

U.S. PATENT DOCUMENTS

| | | | |
|---|---|---|---|
| 8,713,436 | B2 | 4/2014 | Cheng et al. |
| 8,767,593 | B1 | 7/2014 | Allen et al. |
| 9,164,965 | B2 | 10/2015 | Molesky et al. |
| 9,819,547 | B2 * | 11/2017 | Maini ............... H04L 47/41 |
| 9,891,971 | B1 * | 2/2018 | Kuhhirte ............ G06F 11/0709 |
| 10,120,552 | B2 | 11/2018 | King et al. |
| 10,284,437 | B2 * | 5/2019 | Scallan ............... H04L 41/40 |
| 10,379,990 | B2 | 8/2019 | Krishnamoorthy et al. |
| 10,671,263 | B2 | 6/2020 | King et al. |
| 10,678,610 | B2 | 6/2020 | Ebrahimi et al. |
| 10,769,043 | B2 | 9/2020 | Sabharwal et al. |
| 10,866,872 | B1 | 12/2020 | Gudka et al. |
| 10,878,042 | B2 * | 12/2020 | Busch ............... G06F 16/24578 |
| 10,922,493 | B1 * | 2/2021 | Das ................... G06F 40/30 |
| 10,970,632 | B2 | 4/2021 | Sabharwal et al. |
| 10,999,164 | B1 | 5/2021 | Sridhar et al. |
| 11,074,512 | B1 | 7/2021 | Forte et al. |
| 11,080,121 | B2 | 8/2021 | Thornhill et al. |
| 11,550,652 | B1 | 1/2023 | Arora et al. |
| 11,704,474 | B2 | 7/2023 | Huang et al. |
| 2005/0223285 | A1 | 10/2005 | Faihe et al. |
| 2012/0303772 | A1 | 11/2012 | Ennis |
| 2013/0090996 | A1 | 4/2013 | Stark |
| 2013/0103973 | A1 | 4/2013 | Werth et al. |
| 2015/0142825 | A1 | 5/2015 | Deshmukh et al. |
| 2015/0188768 | A1 | 7/2015 | Maini et al. |
| 2017/0061338 | A1 | 3/2017 | Mack et al. |
| 2017/0090736 | A1 | 3/2017 | King et al. |
| 2018/0091528 | A1 | 3/2018 | Shahbaz et al. |
| 2019/0230003 | A1 | 7/2019 | Gao et al. |
| 2019/0391892 | A1 | 12/2019 | Sabharwal et al. |
| 2019/0392310 | A1 | 12/2019 | Sabharwal et al. |
| 2020/0004618 | A1 | 1/2020 | Thornhill et al. |
| 2020/0136928 | A1 * | 4/2020 | Sethi ............... G06N 20/00 |
| 2020/0167255 | A1 | 5/2020 | Gudka et al. |
| 2020/0204428 | A1 | 6/2020 | Sasidharan et al. |
| 2020/0349042 | A1 | 11/2020 | Gudka et al. |
| 2021/0191769 | A1 | 6/2021 | Eschinger et al. |
| 2021/0279160 | A1 | 9/2021 | Huang et al. |
| 2021/0333953 | A1 | 10/2021 | Fitzgerald et al. |
| 2022/0067620 | A1 | 3/2022 | Thornhil et al. |
| 2022/0342796 | A1 | 10/2022 | Cui et al. |
| 2022/0414571 | A1 | 12/2022 | Buggins et al. |
| 2023/0034173 | A1 | 2/2023 | Russell et al. |
| 2023/0062588 | A1 | 3/2023 | Patti et al. |
| 2024/0012917 | A1 | 1/2024 | Milito et al. |
| 2024/0280973 | A1 | 8/2024 | Nalam |

OTHER PUBLICATIONS

"Automation Hybrid Runbook Worker overview", Retrieved at https://docs.microsoft.com/en-us/azure/automation/automation-hybrid-runbook-worker, Retrieved on Apr. 29, 2022, 11 Pages.

"AWS Systems Manager Automation", Retrieved at https://docs.aws.amazon.com/systems-manager/latest/userguide/systems-manager-automation.html, Retrieved at May 2022, 4 Pages.

"Build & Run Remediation Runbook", Retrieved at https://wellarchitectedlabs.com/operational-excellence/200_labs/200_automating_operations_with_playbooks_and_runbooks/4_build_run_remediation_runbook/, Retrieved on May 2022, 9 Pages.

"Complex deployments made easy", Retrieved at https://octopus.com/, Retrieved on May 2022, 6 Pages.

"Configure runbook output and message streams", Retrieved at https://docs.microsoft.com/en-us/azure/automation/automation-runbook-output-and-messages, Jul. 10, 2021, 17 Pages.

"Datasheet-NetBrain-Integrated-Edition-7.0", Retrieved at https://www.netbraintech.com/wp-content/uploads/2017/09/Datasheet-NetBrain-Integrated-Edition-7.0.pdf, Retrieved at May 2022, 2 Pages.

"DRYiCE iAutomate v5.0", Retrieved at https://www.dryice.ai/releases/dryice-iautomate-v50, Retrieved on May 2020, 7 Pages.

"DRYiCE iAutomate" Retrieved at https://www.dryice.ai/resource/brochure/dryice-iautomate, Retrieved on May 2022, 2 Pages.

"DRYiCE iAutomate", Retrieved at https://www.dryice.ai/products-and-platforms/iautomate, Retrieved on May 2022, 7 Pages.

"Evolution of Artificial Intelligence for IT Operations", Retrieved at https://www.siliconindia.com/viewpoints/cxoinsights/evolution-of-artificial-intelligence-for-it-operations-nwid-10000.html, Retrieved on May 2022, 4 Pages.

"HCL Hero—Workload Automation", Retrieved at https://solutions.hcldoc.com/HCL_HERO/!SSL!/Responsive_HTML5/Overview/Product_Overview.htm, Retrieved on May 2022, 2 Pages.

"How a Simple Misconfiguration Can Ruin Everyone's Day—NetBrain", Retrieved at https://www.netbraintech.com/blog/human-error-the-forgotten-single-point-of-failure/, Apr. 28, 2017, 7 Pages.

"IBM Runbook Automation and IBM Alert Notification deliver more agile, automated operations management", Retrieved at https://www.ibm.com/common/ssi/ShowDoc.wss?docURL=/common/ssi/rep_ca/1/897/ENUS216-031/index.html, Feb. 16, 2016, 16 Pages.

"IBM Runbook Automation Guide", Retrieved at https://webcache.googleusercontent.com/search?q=cache:jZ5yusTVFAEJ:https://www.ibm.com/support/knowledgecenter/SSZQDR/com.ibm.rba.doc/rba_pdf_guide.pdf+&cd=11&hl=en&ct=clnk&gl=in, Retrieved on May 2022, 138 Pages.

"Manage role permissions and security in Automation", Retrieved at https://docs.microsoft.com/en-us/azure/automation/automation-role-based-access-control, Sep. 26, 2021, 30 Pages.

"Microsoft Azure Automation _ Netreo", Retrieved at https://www.netreo.com/wpsandbox/solutions/microsoft-azure-automation/, Retrieved at May 2022, 5 Pages.

"Octopus Deploy 2019.11: Operations Runbooks RTW", Retrieved at https://octopus.com/blog/octopus-release-2019.11, Dec. 18, 2019, 4 Pages.

"Octopus Deploy Documentation—Runbooks", Retrieved at https://octopus.com/docs/runbooks, Retrieved on May 2022, 2 Pages.

"Runbook Automation (Rundeck)", Retrieved at https://www.pagerduty.com/resources/learn/aiops-incident-management-2021/, Retrieved on May 2022, 8 Pages.

(56) References Cited

OTHER PUBLICATIONS

"Runbooks permissions", Retrieved at https://octopus.com/docs/runbooks/runbook-permissions, Retrieved at May 2022, 2 Pages.

"The Guide to Automating Runbook Execution—Shoreline", Retrieved at https://shoreline.io/blog/the-guide-to-automating-runbook-execution, Feb. 25, 2021, 9 Pages.

"Troubleshoot Azure Automation runbook issues_Microsoft Docs", Retrieved at https://docs.microsoft.com/en-us/azure/automation/troubleshoot/runbooks, Sep. 24, 2021, 26 Pages.

"Use runbooks to automate operations activities", Retrieved at https://www.ibm.com/garage/method/practices/manage/runbooks-to-automate-operations/, Retrieved on May 2022, 9 Pages.

"What is Azure Automation Management—Netreo Newtork Moniroting Tool", Retrieved at https://www.netreo.com/cloud-automation/what-is-azure-automation-management/, Sep. 9, 2015, 2 Pages.

"What is Runbook Automation?", Retrieved at https://www.rundeck.com/what-is-runbook-automation, Retrieved on May 2022, 10 Pages.

\* cited by examiner

METHOD AND SYSTEM FOR RECOMMENDING RUNBOOKS FOR DETECTED EVENTS

BENEFIT CLAIMS; RELATED APPLICATIONS; INCORPORATION BY REFERENCE

This application claims the benefit of U.S. Provisional Patent Application 63/262,832 filed on Sep. 29, 2021; U.S. Provisional Patent Application 63/236,557, filed Aug. 24, 2021, U.S. Provisional Patent Application 63/236,561, filed August 24; U.S. Provisional Patent Application 63/236,563, filed August 24; U.S. Provisional Patent Application 63/236,565, filed August 24, all of which are hereby incorporated by reference. This application also incorporates by reference the following applications: application Ser. No. 17/725,122, filed on Apr. 20, 2022 titled "Recommending a Candidate Runbook Based on a Relevance of the Results of the Candidate Runbook to Remediation of an Event"; application Ser. No. 17/725,143, filed on Apr. 20, 2022 titled "Automated Runbook Operation Recommendations"; application Ser. No. 17/725,147, filed on Apr. 20, 2022 titled "Identification and Retrieval of Supplemental Information for Runbook Operations".

This application further incorporates by reference, in their entirety, U.S. Pat. Nos. 9,164,965, 10,379,990, and 10,678,610.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to recommending relevant runbooks during a runbook selection process. In particular, the present disclosure relates to an event-aware, topology-aware runbook selection for remediating an event.

BACKGROUND

Modern information technology systems include a large number of diverse types of components. For example, there may be database systems, network systems, computer applications, and the like. Each such system may be administered and/or monitored by specialized information technology (IT) professionals.

During normal operation, a computer system may produce or encounter behavior or results that are not expected or desired by the operators monitoring the system. Such behavior or results may generate event records (for example, process is running slow, or process is stalled). Upon encountering an event log or incident message, a user may wish to resolve the issue by executing one or more remediation tasks. A user may execute remediation tasks defined by a runbook. Runbooks are guides a user may follow to perform a series of tasks to achieve a desired result, such as the remediation of unexpected or undesired results in the system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
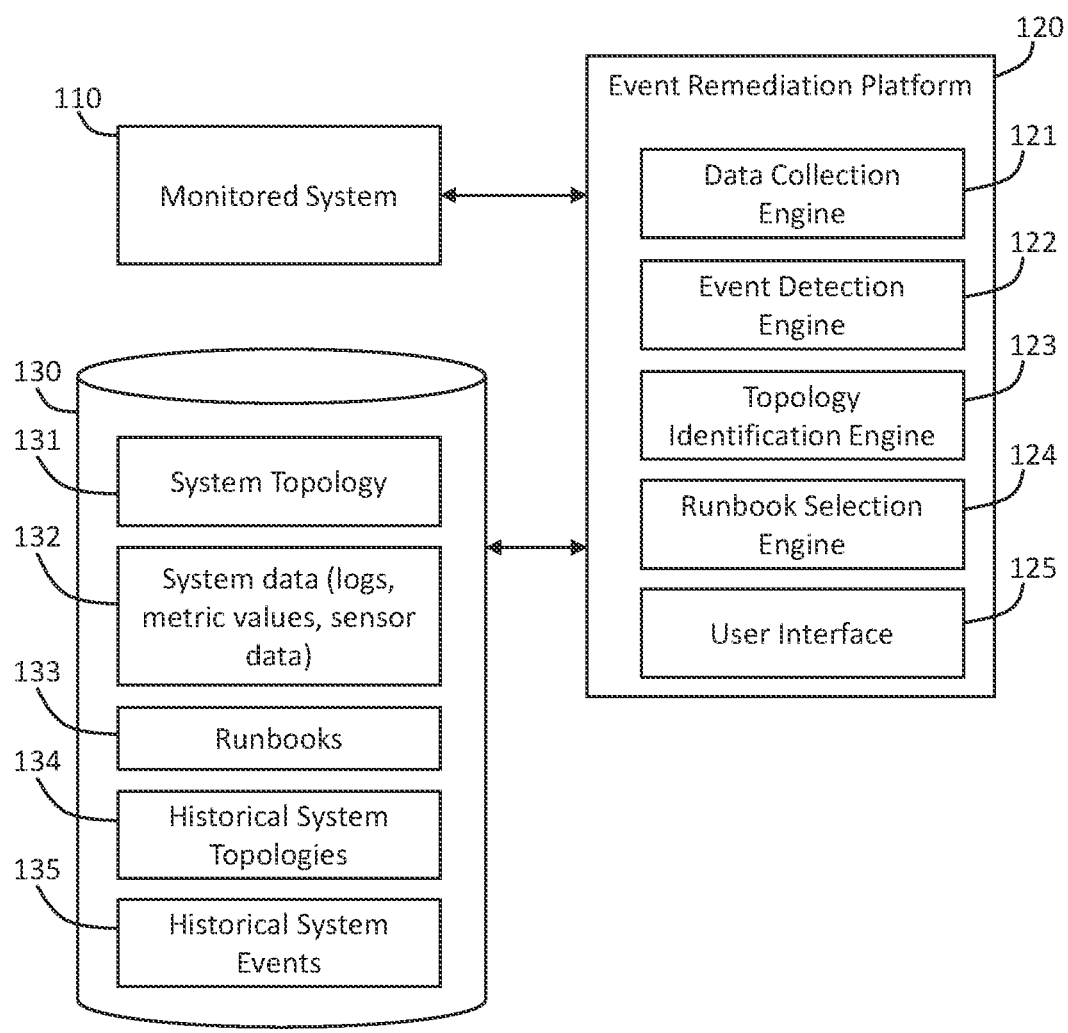
FIG. 1A illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. EXAMPLE SYSTEM TOPOLOGY
4. TOPOLOGY-BASED RECOMMENDATION OF RUNBOOKS FOR EVENT DIAGNOSIS AND REMEDIATION
5. EVENT-BASED RECOMMENDATION OF RUNBOOKS FOR EVENT DIAGNOSIS AND REMEDIATION
6. PREVIEWING RUNBOOK OPERATIONS TO RECOMMEND CANDIDATE RUNBOOK
7. EXAMPLE EMBODIMENTS
8. COMPUTER NETWORKS AND CLOUD NETWORKS
9. MISCELLANEOUS; EXTENSIONS
10. HARDWARE OVERVIEW

1. General Overview

Runbooks define sets of independently-executable operations that users may perform to diagnose and remediate issues that arise in systems. For example, information technology (IT) technicians may open a particular runbook to diagnose a cause of a data communication failure based on detecting that communications with a data communication device have been interrupted. The runbook may also include steps to restore access to the data communication device. A complex system may have hundreds or thousands of runbooks to assist technicians in diagnosing causes of events and remediating events. Accordingly, it may be difficult for a technician to identify the particular runbook that should be executed for a particular detected event.

One or more embodiments select a particular runbook to recommend for diagnosing causes and remediating events detected in a system based on system topology data and/or event attributes associated with the detected event. A system obtains a system topology associated with an event. The system topology specifies components in the system and relationships among components in the system. The system identifies another topology that is similar to the identified system topology. The other topology may be selected from among a set of stored topologies. If the stored topology is sufficiently similar to the system topology, the system recommends a runbook associated with the stored topology to remediate the detected event. For example, the runbook may be a runbook that was previously-executed with the stored topology to successfully remediate the detected event.

For example, the system may detect a communication failure in a server. The system identifies the additional components—including another server, a database, and a gateway—in communication with the server in which the failure was detected. The system identifies a stored topology including a similar topology—including a server in communication with another server and a gateway. The system selects a runbook associated with the stored topology to recommend for remediating the server failure based on determining that the stored topology is similar to the topology associated with the server failure. The system may determine whether a stored topology is similar to a system topology in which an event is detected based on a number of components in common between the two topologies.

One or more embodiments present a runbook selection interface that allows a user to select an event. The system collects metadata associated with the selected event. The metadata may include event data, such as a time of the event, a device on which the event occurred, programs running when the event occurred, and users affected by the event. The metadata may also include topology data, including the topological relationships of system components in the system in which the event occurred. The system presents a runbook in the runbook selection interface to execute to remediate the selected event based on topology attributes and event attributes.

One or more embodiments recommend a runbook to remediate a detected event based on a relationship between a target component associated with the event and one or more other components associated with operations of a runbook. For example, the system may identify operations in a runbook that require a user to interface with four system components. The system may determine, based on the system topology, that the four components are closely related to the target component associated with the event. Based on determining that the components associated with the runbook are closely related to a target component associated with the event, the system recommends the runbook to remediate the event.

One or more embodiments recommend a runbook to diagnose a cause of an event and/or remediate a detected event based on a similarity between a detected event and an event associated with the runbook. The system identifies attributes associated with the event, such as such as a time of the event, a device on which the event occurred, programs running when the event occurred, and users affected by the event. The system identifies attributes associated with a stored event. If the stored event has a predefined similarity to the detected event, the system recommends a runbook that was used to remediate the stored event for remediating the detected event.

An example embodiment detects a user selection of one runbook to remediate an event. The system analyzes event attributes associated with the detected event, with a second event associated with the selected runbook, and with a third event associated with a third runbook. The system recommends the third runbook as an alternative to the selected runbook for remediating the detected event, based on determining that the third event is more similar than the second event to the detected event.

One or more embodiments allow system administrators to associate particular runbooks with particular events. For example, a system administrator may specify via the runbook selection interface that a particular runbook should be presented when a particular target system component goes offline or when a particular operation threshold is met. In addition, or in the alternative, the system administrator may generate a set of labels or tags associated with a runbook to describe a topology associated with the runbook. The system may compare the topology associated with the runbook with a topology associated with a detected event to select the runbook to remediate the detected event. The system administrator may also facilitate the display of the runbook in another event management system that performs particular actions upon detecting events. For example, the event management system may detect that a particular server has gone offline unexpectedly. The event management system may perform a set of actions in response to the server going down including generating notifications to administrators, re-routing data requests to a backup server, and presenting a particular runbook to remediate the event. The system may recommend for remediating an event both the administrator specified runbooks and one or more additional runbooks. The system may identify the additional runbooks based on a similarity of a topology associated with the detected event with topologies associated with the additional runbooks.

One or more embodiments receive user feedback in response to presenting runbook recommendations. A user may interact with a user interface element of a GUI to indicate (a) that a recommendation was helpful to diagnose a cause and remediate an event, or (b) that a recommendation is not helpful to diagnose the cause and remediate the event. For example, the system may recommend two runbooks based on a detected event. One runbook may include operations associated with an application running in the monitored system. The other runbook may include operations associated with an application that is not running in the system. A user may select an icon representing positive feedback to indicate the former runbook is helpful to remediate the event. The user may select another icon representing negative feedback to indicate the latter runbook is not helpful to remediate the event, since it is directed to an application that is not running in the system. The system may update runbook ratings based on the user feedback. The system may refrain from recommending the latter runbook to remediate the event, based on the reduced rating associated with the runbook, the next time the same event occurs.

One or more embodiments preview one or more runbook operations, without user initiation of the runbook operations, to identify interesting runbook operation outcomes. A system executes, without user initiation of runbook operations, one or more operations associated with the runbook operations. The system may execute the runbook operations, themselves, or operations that are not runbook operations but that provide an insight into the runbook operations. The system analyzes the operation results to determine whether the operations generate interesting results. For example, the system may determine whether the operation results are relevant to a detected event. The system recommends a candidate runbook based on a relevance of the results of operations associated with the candidate runbook to the diagnosis and/or remediation of an event. The system determines the relevance of the results to the diagnosis and/or remediation of the event based on (a) the results themselves or (b) information associated with the results. Results may include data generated by executing one or more of the independently executable operations of the runbook. Information associated with the results may include, for example, the data that is be used to compute the results, the type of data included in the results, the source of the results, the level of detail included in the results, the software/hardware component information that is included in the results. Information about the results may indicate whether the type of issue identified by the results is an issue detected in a target software/hardware component or environment affected by the event.

The system may generate information about the results by analyzing results that have been generated by executing operation(s) of the candidate runbook prior to a user selection of a runbook for remediating an event. Alternatively, or additionally, the system may obtain information about the results by executing a query that returns the information from a database (without obtaining the results themselves by executing the operation(s) of the candidate runbook).

For example, a system may identify an event "lost communication to router." The system may identify a candidate runbook associated with the event "lost communication to router." The system may preview one or more runbook operations by either (a) performing an operation specified in a step the runbook, or (b) performing an operation, not specified in any step of the runbook, which provides information about an operation specified in the runbook. If the runbook step specifies an operation "check power connection to network router," the system may preview the operation, prior to a user executing the operation, by checking the power to the network router. Alternatively, the system may preview the operation by performing an operation that provides information about the power connection to the network router, such as transmitting a status check signal to the router. If the router returns a status response, the system may determine that the router has power. The system may determine that, since the router has power, the power of the router does not likely contribute to the detected event, and there for the operation is not "interesting" in the context of the event. Accordingly, the system may reduce a relevancy score of the runbook.

According to another example, if a step specifies an operation "check network router status in Status screen," the system may preview the runbook operation by analyzing data transmission logs between the router and an adjacent component in the network. If the router is transmitting an expected amount of data, the system may determine that the step "check network router status in Status screen" is unlikely to be helpful to remediate the event and is therefore not "interesting." As a result, the system may reduce a relevancy score of the associated runbook.

As another example, a system may identify an event labeled "data loss exceeds threshold." The system may identify a set of candidate runbooks associated with the event type "data loss exceeds threshold." Prior to recommending any runbook to remediate the event, the system previews the runbooks by executing one or more operations associated with the candidate runbooks. For example, the system may perform a step specified in a runbook to "check data transmission queue log for server A." The system may, prior to recommending the runbook, compare data associated with a data transmission queue log to threshold data. For example, the system may determine whether the data transmission queue was at capacity. Based on the results of the executed operation, the system determines whether the particular runbook includes operations with results that are "interesting" in connection with the detected event. The system determines whether to recommend the runbook to remediate the event based on whether the particular runbook includes operations with results that are "interesting" in connection with the detected event. If the system determines that the results of the executed operation are likely to result in remediating the identified event (e.g., "data loss exceeds threshold"), the system increases a relevancy score of the associated runbook. The system may rank multiple runbooks. The system may recommend one or more runbooks having the highest relevancy scores to remediate the event.

In one or more embodiments, the system presents a runbook selection interface to allow a user to select an event for which the user would like to execute a runbook. The system may execute the operations associated with steps of one or more candidate runbooks associated with an event when the user selects an interface element associated with the event in the runbook selection interface.

One or more embodiments described in this Specification and/or recited in the claims may not be included in this General Overview section.

2. System Architecture

FIG. 1A illustrates a system 100 in accordance with one or more embodiments. As illustrated in FIG. 1A, system 100 includes a system 110 being monitored, an event remediation platform 120, and a data repository 130. In one or more embodiments, the system 100 may include more or fewer components than the components illustrated in FIG. 1A. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the event remediation platform 120. Alternatively, or additionally, a data repository 130 may be implemented or executed on a computing system separate from the event remediation platform 120. A data repository 130 may be communicatively coupled to the event remediation platform 120 via a direct connection or via a network.

Information describing a system topology 131, system data 132, runbooks 133, historical system topologies 134, and historical system events 135 may be implemented across any of components within the system 100. However, this information is illustrated within the data repository 104 for purposes of clarity and explanation.

In one or more embodiments, the event remediation platform 120 refers to hardware and/or software configured to perform operations described herein for recommending runbooks to diagnose causes of detected events and remediate the detected events. Examples of operations for recommending runbooks to diagnose causes of detected events and remediate detected events are described below with reference to FIGS. 2-4. Examples of operations for previewing operations of runbooks to identify interesting runbooks for recommending diagnosing and/or remediating events are described below with reference to FIG. 5.

In an embodiment, the event remediation platform 120 is implemented on one or more digital devices. The term "digital device" refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

An event remediation platform 120 includes a data collection engine 121. The data collection engine 121 collects data, such as log data, sensor data, analog and digital device status data, and program state data from a monitored system 110. The data collection engine 121 may also obtain system data 132 from a data repository 130. The system data 132 may include log data, sensor data, and metric values of system performance metrics generated by the monitored system 110.

An event detection engine 122 monitors the data obtained by the data collection engine 121 to detect an event in the system 110. For example, the event detection system 122 may monitor activity logs generated by one or more applications running in the system 110 and sensor data generating output values based on characteristics of devices in the system 110 to detect a failure of one or more components in the system 110. Examples of events may include: a computing device failing or operating below a defined threshold, an application failing or operating below a defined threshold, access to a device or application by an unauthorized entity, data transmission rates below a defined threshold, data latency along communication channels above a defined threshold, data lost along communication channels above a defined threshold, and sensor levels monitoring system components exceeding, or failing to meet, defined thresholds.

A topology identification engine 123 identifies a topology of the monitored system 110. The topology includes the physical components and interconnections among the physical components. Examples of physical components that make up system topologies include computing devices, communication channels connecting the computing devices, power supplies, power channels, device storage fixtures, cooling components, and system monitoring components. The topology also includes applications running on the physical components, configurations of sub-components and software on the physical components, and data stored by the physical components. For example, the topology identification engine 123 may identify as a part of a system 110 topology a database storing data type A and data type B associated with two different tenants, a server connected to the database to allow access to the database, applications running on virtual machines hosted by the server to perform queries to the database, communication channels between the server and database, and power channels from a power supply to the server and the database. The topology identification engine 123 identifies the components of the system topology 131 based on one or both of user input via a user interface 125 and detecting, without user input, attributes of system components. For example, in a cloud-based system, users may select components to be included in a computing environment. The topology identification engine 123 may identify the user selections and the cloud-maintained physical devices (e.g., remote devices maintained by a cloud environment management entity) associated with the user selections. The system may detect when a new device is added to the cloud environment via communication protocols, for example, without receiving user input to perform the detection of the new device. For example, a cloud environment management entity may connect a firewall device to a server associated with a user selection. The topology identification entity 123 may identify, without user prompting, characteristics of the firewall device, such as port information, applications running on the firewall device, cloud devices connected to the firewall device, etc. According to one embodiment, the topology identification engine 123 adds newly-detected devices, applications running on devices, and other detected hardware, to the system topology 131.

According to one or more embodiments, the topology identification engine 123 includes user interface elements, such as display elements displayed on the user interface 125, to allow an administrator to specify topology elements of the monitored system 110. For example, an administrator may provide descriptions of components such as "main server," "backup server," "client A server," "client B server," "Database—Client A and Client B," etc. The topology identification engine 123 may store the administrator-provided topology data in the system topology 131.

A runbook selection engine 124 performs operations to select a runbook to diagnose a cause of a detected event and/or remediate a detected event. For example, the runbook selection engine 124 may compare the system topology 131 associated with a detected event to historical system topologies 134 of the same system 110 or other systems to identify other runbooks associated with historical system topologies 134 having a particular similarity to the system topology 131. The runbook selection engine 124 may recommend one or more runbooks for execution associated with a detected event based on the similarity between the system topology 131 and the historical system topologies 134. According to another example, the runbook selection engine 124 may identify a similarity between the system topology 131 and system topology components associated with particular steps of different runbooks 133. The runbook selection engine 124 may identify system components associated with steps of runbooks 133. The runbook selection engine 124 may recommend one or more runbooks 133 for execution based on a similarity between the system components of the runbooks 133 and the system components of the system topology 131.

A runbook selection engine 124 performs operations to select a runbook to diagnose and/or remediate a detected event. The runbook selection engine 124 identifies candidate runbooks, from among the stored runbooks 133, associated with a detected event. For example, if an event includes a description "application crash," the runbook selection engine 124 may identify ten different runbooks 133 that include the description "application crash." The runbook selection engine 124 analyzes attributes associated with the ten different candidate runbooks 133 to select one or more runbooks to recommend to diagnose and/or remediate the application crash.

According to one or more embodiments, the runbook selection engine 124 compares the system topology 131 associated with a detected event to historical system topologies 134 of the same system 110 or other systems to identify other runbooks associated with historical system topologies 134 having a particular similarity to the system topology 131. The runbook selection engine 124 may recommend one or more runbooks for execution associated with a detected event based on the similarity between the system topology 131 and the historical system topologies 134. According to another example, the runbook selection engine 124 may identify a similarity between the system topology 131 and system topology components associated with particular steps of different runbooks 133. The runbook selection engine 124 may identify system components associated with steps of runbooks 133. The runbook selection engine 124 may recommend one or more runbooks 133 for execution based on a similarity between the system components of the runbooks 133 and the system components of the system topology 131.

According to another example, the system may recommend a runbook for execution based on a similarity between a detected event and one or more historical system events 135. For example, the runbook selection engine 124 may identify attributes associated with a detected event. Attributes may include, for example, log values, sensor values, and topology characteristics. The runbook selection engine 124 may identify a similarity between the attributes of the detected event and attributes of one or more historical system events 135. The runbook selection engine 124 may identify runbooks applied to the historical system events 135. The runbook selection engine 124 may select one or more of the runbooks applied to the historical system events 135 to apply to the presently-detected event based on a similarity between the attributes of the historical system events 135 and the presently-detected event.

According to another example, the runbook selection engine 124 previews one or more runbook operations of candidate runbooks to identify interesting runbook operation results. The runbook selection engine 124 applies a relevancy score to candidate runbooks based on whether the operations generated interesting results. Specifically, the runbook selection engine 124 executes one or more operations associated with the candidate runbooks to determine which of the candidate runbooks to recommend for execution to remediate an event. The runbook selection engine 124 may execute one or more of the independently executable operations that make up the runbook to obtain operation results. Alternatively, the runbook selection engine 124 may execute an operation that is not expressly specified in any of the independently executable operations, but which provides information about the relevance of the operation to the remediation of the detected event.

For example, a candidate runbook may include an operation, among a set of independently executable operations, to "check port configuration." According to one embodiment, the runbook selection engine 124 may, prior to presenting the candidate runbook as a recommendation to remediate an event, perform the operation to check the port configurations. Specifically, the runbook selection engine 124 may compare data stored in memory and describing the port configurations to expected port configurations. The runbook selection engine 124 analyzes the results of the operation to determine whether the results are interesting, in connection with the detected event. Based on the analysis, the runbook selection engine 124 may assign or adjust a relevancy score for the candidate runbook. If the runbook selection engine 124 determines that the results of the operation do not provide an interesting result, the runbook selection engine 124 may reduce a relevancy score for the candidate runbook. For example, if the port configurations are consistent with the expected configurations, the runbook selection engine 124 may determine that checking the port configurations is unlikely to remediate a detected event and therefore the results are not interesting in connection with the detected event. The system may accordingly reduce a relevancy score of the associated candidate runbook. On the other hand, if the runbook selection engine 124 determines that the port configuration values are not consistent with an expected configuration, the runbook selection engine 124 may determine that the results are interesting in connection with the event. The runbook selection engine 124 may increase the relevancy score of the candidate runbook, indicating that the operation to check the port configurations may be likely to remediate a detected event.

According to another embodiment, the runbook selection engine 124 may, prior to user selection of a candidate runbook, perform an operation associated with the candidate runbook, but which is not one of the particular independently executable operations defined by the candidate runbook. For example, if the candidate runbook includes the operation to "check the port configuration," the runbook selection engine 124 may perform an operation to check a transmission log associated with the ports of the target component. If the runbook selection engine 124 determines that the results of the operation are not interesting in connection with the detected event, the runbook selection engine 124 may reduce a relevancy score for the candidate runbook. For example, if the runbook selection engine 124 determines that the transmission log indicates normal data transmission to and from the data ports when the detected event occurred, the runbook selection engine 124 may determine that the results are not interesting in connection with the detected event. The runbook selection engine 124 assign a low relevancy score to the candidate runbook. Conversely, if the runbook selection engine 124 determined that the transmission log indicates an interruption in data transmission to and from the data ports, the runbook selection engine 124 may increase a relevancy score assigned to the candidate runbook, indicating that the operation of the candidate runbook to check the port configurations may be likely to remediate a detected event.

According to yet another example, the system may consider a combination of criteria to adjust the relevancy score of a candidate runbook. The criteria may include, for example: (a) whether operations of the runbook generate interesting results, (b) whether attributes of a detected event are similar to attributes of an event associated with a candidate runbook, and (c) whether a topology associated with the detected event is similar to a topology associated with the candidate runbook. The runbook selection engine 124 may adjust the relevancy score for a candidate runbook based on a similarity between a detected event and one or more historical system events 135. For example, the runbook selection engine 124 may identify a similarity between the attributes of the detected event and attributes of one or more historical system events 135. The runbook selection engine 124 may identify runbooks applied to the historical system events 135. The runbook selection engine 124 may increase the relevancy score for one or more candidate runbooks based on a similarity between the attributes of the historical system events 135 associated with the candidate runbooks and the presently-detected event.

According to one or more embodiments, the runbook selection engine 124 selects one or more operations from among the independently-executable operations of a candidate runbook to perform based on one or both of event data associated with a detected event and topology data associated with the detected event. For example, if a detected event is assigned a name "communication lost to server," the system may analyze event data to identify the time of the event, an ID of the server to which communications were lost, and log data identifying applications running on the server. The system may analyze the system topology 131 to identify components in the monitored system 110 in communication with the server. The system may identify a set of candidate runbooks associated with an event type "communication lost to server." The runbook selection engine 124 may select a set of preview operations to execute in connection with one or more of the candidate runbooks based on the event data and topology data. For example, the runbook selection engine 124 may perform, based on the obtained event data, an operation associated with an independently-executable operation of a candidate runbook to "check application log on server." According to another example, the runbook selection engine 124 may perform, based on the obtained system topology data, an operation associated with an independently-executable operation of another candidate runbook to "check status of gateway in communication with server." The runbook selection engine 124 selects one or more of the candidate runbooks to recommend for diagnosing and/or remediating the event "communication lost to server" based on (a) whether operations of the runbook generate interesting results, (b) whether attributes of a detected event are similar to attributes of an event associated with a candidate runbook, and (c) whether a topology associated with the detected event is similar to a topology associated with the candidate runbook.

According to one or more embodiments, the runbook selection engine 124 includes a graphical user interface (GUI) generator to display a GUI on the user interface 125. The GUI may include a runbook selection interface. The runbook selection interface may display an event and one or more recommended runbooks for remediating the event. The GUI may display interface elements to allow users to provide feedback on the recommended runbooks.

The event remediation platform 120 may display one or more runbooks for selection by a user via the user interface 125. In addition, a user may perform steps of a selected runbook via the user interface 125. In one or more embodiments, interface 125 refers to hardware and/or software configured to facilitate communications between a user and the event remediation platform 120. Interface 125 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of interface 125 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 125 is specified in one or more other languages, such as Java, C, or C++.

3. Example System Topology

Figure 1B:
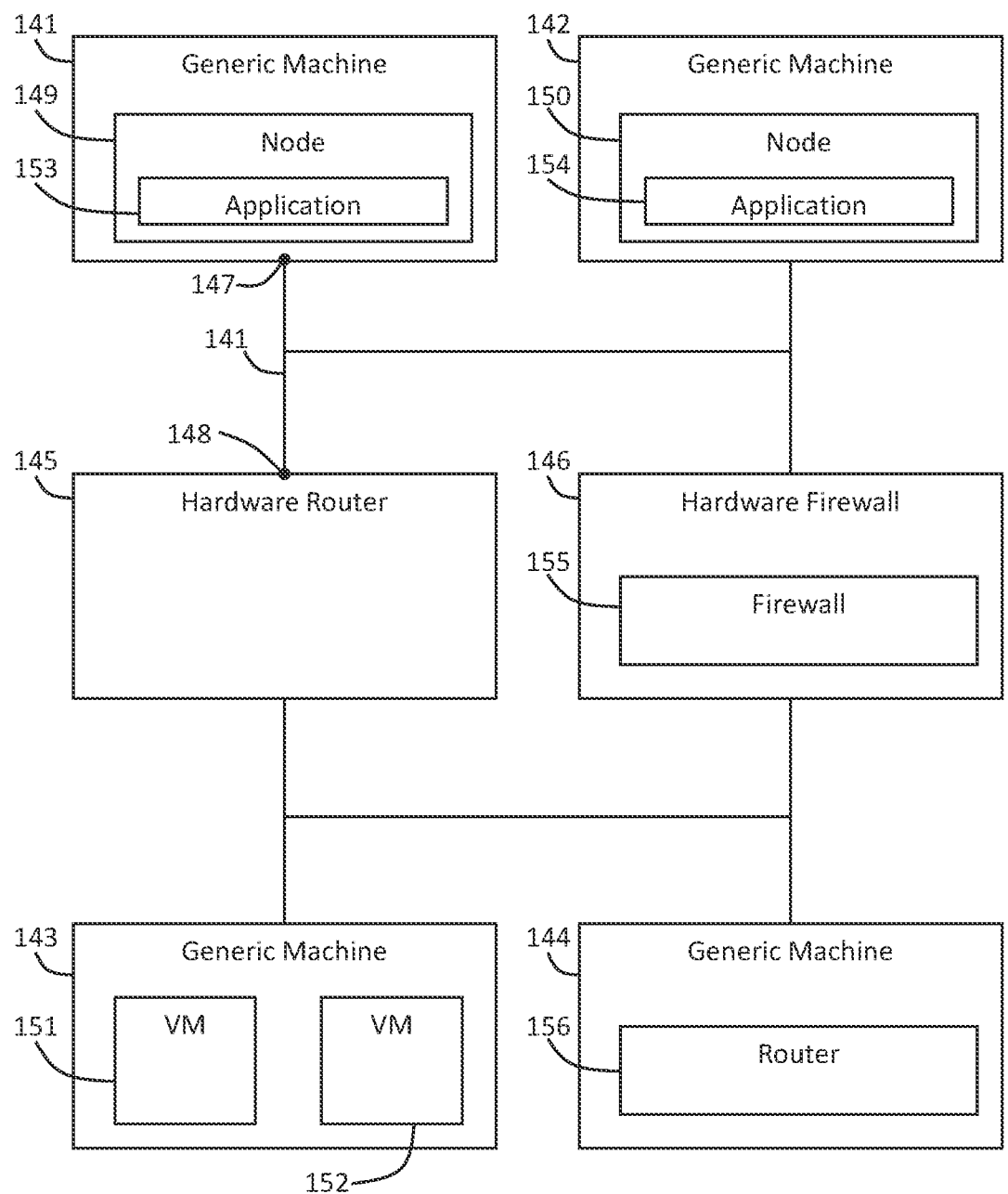
FIG. 1B illustrates an example system topology in accordance with one or more embodiments.

FIG. 1B illustrates an example of a system topology 131, in accordance with one or more embodiments. The "system topology" refers to the overall architecture, arrangements, types of resources, dependencies and/or usage of resources in the monitored system 110.

According to one or more embodiments, the system generates the system topology 131 using topology metadata. Topology metadata includes information that describes the types of target components deployed and involved in the execution of an application. Example target types may include, without limitation, cloud services, aggregate services, and other types of software services, clusters, groups, hosts, Java Virtual Machines (JVMs), JVM pools, applications, servers, database instances, OS services, central processing units (CPUs), network ports, memory pools, and any other classification of a software or hardware resource.

In one or more embodiment, the topology metadata includes information describing dependencies and/or other relationships between targets. For instance, a topology graph may show that one node (corresponding to a target resource) is connected to another node (corresponding to a different target resource), indicating that the two nodes/corresponding target resources have a relationship with each other. If one target resource is "connected to" another target resource in a topology graph, then the two resources are determined to be functionally associated with each other. In various embodiments, the relationships may indicate more than just a connection between two nodes such as a functionality and/or a direction associated with that connection. For example, a functionality is present in a relationship of "A runs on B" or "A is stored on B" or "A uses B as a load balancer." A direction may be present in a relationship of "A uses B" or "B uses A, or even "B uses A and A uses B." The topology graph may be traversed to determine which resources are functionally dependent on other resources and/or other relationship information. In the context of an application server, for example, a topology graph may have a node corresponding to the application server connected to several applications, indicating that the server is "connected" to each of the applications. The topology graph may further indicate that each of the applications are functionally dependent on the application server.

Complex software applications often include a plurality of tiers or layers. Each "tier" or "layer" of a multi-tier application represents a distinct logical and/or physical element that is responsible for a different set of functions. The number and configuration of tiers within a multi-tier architecture may vary, depending on the particular implementation. For instance, a three-tier system may comprise a presentation tier comprising logic for displaying and/or receiving information, an application tier comprising logic for implementing application-specific functions, and a data tier comprising logic for storing and retrieving data. In other examples, the multi-tier architecture may include, in addition or alternatively to the tiers previously listed, a web tier comprising logic for processing web requests and/or a middleware tier comprising logic to connect other tiers within the architecture, and/or any other tier comprising one or more software and/or one or more hardware components. The topology metadata may describe the relationship between target resources in the same tier and in different tiers, including the types of target deployed at each tier.

In a clustered environment, topology metadata may capture which software components are deployed across a plurality of physical and/or virtual hosts. For example, the topology metadata may indicate that a first instance of an application is executing on a first server/host, a second instance of the application is executing on a second server/host, etc. In the present example, the first instance of the application is functionally dependent on the server and host on which it executed, but not on servers and hosts in other nodes in the cluster. However, if one of the nodes in another cluster becomes non-operational, it may result in increased traffic on the first node.

The system topology 131 may include a physical topology and a virtual topology. For example, the physical topology may include generic computing machines 141, 142, 143, and 144. The generic computing machines may be, for example, servers. The physical topology may include a hardware router 145 and a hardware firewall device 146. The physical topology of the system topology 131 may include more or fewer digital devices than the digital devices illustrated in FIG. 1B. Each digital device is represented as a box. Each digital device may be connected to any number of one or more other digital devices within physical topology. The digital devices may be located in a single geographical location or distributed across various geographical locations. The physical devices may include physical ports 147 and 148. The physical ports 147 and 148 may connect physical devices via wires. In addition, or in the alternative, one or more of the devices 141-146 may communicate wirelessly.

In an embodiment, system topology 131 may correspond to a cloud network. The digital devices shown in system topology 131 may be shared amongst multiple client devices and/or tenants. A particular digital device may perform a same function for different client devices and/or tenants. A particular digital device may perform different functions for different client devices and/or tenants.

According to one or more embodiments, the physical topology includes a virtual topology instantiated on the physical topology. Referring to FIG. 1B, elements of the virtual topology include nodes 149 and 150, virtual machines 151 and 152, firewall 155, and a virtual router 156. In one embodiment of the invention, a node is a representation of a managed entity or application type. A node may represent hardware (such as a managed host) or software (such as an application). In the example illustrated in FIG. 1B, node 149 includes an application 153 and node 150 includes an application 154. In one embodiment of the invention, for an application view type, nodes corresponding to an application type are also generated. According to one embodiment, when a system instantiates a node, the system populates the node with data from a managed entity table and a dynamic state table. The system may set a node's tier based on the type of entity the node represents. In one embodiment of the invention, managed entities may be organized into one of three tiers based on the type of entity: a web tier, a middleware tier, and a database tier.

There may be multiple ways to instantiate a virtual topology, described by a same virtual topology specification, on a physical topology. Instantiation of a virtual topology on a physical topology includes mapping virtual topology entities (VTEs) described in a virtual topology specification to digital devices of the physical topology.

Each VTE is associated with one or more functions. Examples of functions include data routing, data filtering, data inspection, data storage, and/or any other type of data processing function.

A virtual topology is instantiated on a physical topology based on a virtual topology specification. During instantiation, VTEs of a virtual topology specification are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

Multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

VTEs in a virtual topology may be executed in an overlay network. The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally, or alternatively, the addresses may be dynamically assigned (for example, by a Dynamic Host Configuration Protocol (DHCP) and/or another application). Data is transmitted between VTEs in a virtual topology by tunneling through the underlying network.

The system topology 131 specifies how data is supposed to traverse through the VTEs. Data is supposed to traverse through the VTEs according to connections linking the VTEs. For example, data may be transmitted from node 149 to virtual machine 151 by traversing through firewall 155, and router 156. At firewall 155, the data may be processed to perform a firewall functionality associated with firewall 155. Based on the firewall functionality, the data may be inspected to determine whether to allow the data to pass through. Additionally, at router 156, the data may be processed to perform the routing functionality of router 156. Based on the routing functionality, the next hop of the data may be identified as virtual machine 151. Router 156 may forward the data to virtual machine 151.

Figure 2:
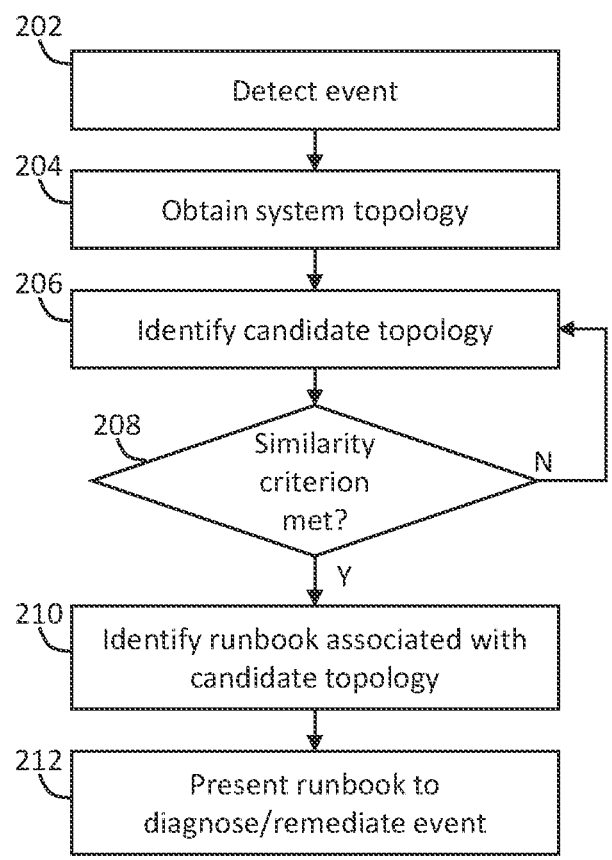
FIG. 2 illustrates an example set of operations for recommending a runbook to execute to remediate an event based on a system topology in accordance with one or more embodiments.

4. Topology-Based Recommendation of Runbooks for Event Diagnosis and Remediation FIG. 2 illustrates an example set of operations for recommending a runbook for diagnosing and/or remediating an event based on a system topology in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system may include one or more monitoring devices and monitoring applications. The system detects, by the monitoring devices and/or applications, an event associated with a monitored system (Operation 202). For example, the system may identify values or events in an event log associated with a monitoring application. The event log may identify: sensor values, data throughput values, data storage values, application states (e.g., "OK," and "not responding"), and access events, such as identifying requests from entities to access applications or devices. According to one example embodiment, the system identifies anomalous sensor values or anomalous application states that are outside threshold values for a correctly-operating state. According to another example embodiment, the system detects an access request to access a system component from an entity that is not authorized to access the system component. In one example, embodiment, the system may detect a successful access attempt by an unauthorized or unrecognized entity.

According to one or more embodiments, detecting an event includes analyzing predictions generated by a machine learning model that monitors sensor data and other system data. According to one or more alternative embodiments, detecting an event includes analyzing a user-generated event entry, such as a "ticket" generated by one user to inform one or more additional users, such as technicians trained to maintain a system, of an anomaly. The ticket may be based on a user complaint (e.g., "a computer is not working"). Alternatively, the ticket may be based on system-detected data (e.g., sensors monitoring a component indicate the component is operating outside a threshold range of values). According to one or more embodiments, detecting an event includes comparing log entries to known or predicted anomalies. For example, a failure to log in to an application or device may be detected based on a log entry generated by the application or device. The system may analyze the log entry, identify an event (e.g., log-in failure) based on the log entry, and collect system metadata associated with the event. System metadata may include related log entries (e.g., previous log-in failures originating from the same device), user information, application information, device information, communication protocols, and security protocols.

The system obtains a system topology of the monitored system (Operation 204). The system topology identifies physical system components, such as computing devices, communication channels connecting the computing devices, power channels supplying power to the computing devices, applications running on the computing devices, and data stored in the computing devices. The topology may further identify access authorization for particular system components, such as which entities have authorization to access different system hardware and software. The system topology may be stored in a data repository. The stored system topology may be updated based on changes in the system topology. According to an alternative embodiment, a system may detect a system topology in real-time or on demand, when an event is detected in the monitored system.

According to an example embodiment, the system may detect an event, such as a log-in failure in a device. The system may identify the topology associated with the device, including: an application into which a user attempted to log in, other applications running on the device, types of data stored on the device, communication channels between the device and one or more additional devices, hardware and software facilitating communication between the device and one or more additional devices, a communications path (e.g., communication channels, devices, and communications-layer programs) between the device and another device from which the log in attempt originated, additional devices connected to the target device, programs running on the additional devices, and data stored in the additional devices. For example, the system may determine that a user attempted to log in to an application running on a compute node of a cloud computing environment from a terminal external to the cloud computing environment. The system may identify the topology of the cloud computing environment, including additional compute nodes, middle tier nodes, databases, and security hardware, such as firewall devices. The system may further identify the applications running on the additional devices.

The system identifies a candidate system topology (Operation 206). The system may store multiple different system topologies. The system topologies may be based on actual system topologies. For example, a system topology may correspond to a configuration of the monitored system at a particular point in time in the past. Alternatively, a system topology may correspond to a topology of a different system. Different system topologies may be classified by system components and system functions. For example, if the monitored system includes a database and one or more servers running virtual machines, the system may select a candidate topology associated with systems that include databases or systems that have run virtual machines. Examples of classifications of candidate topologies include characteristics of a monitored system, such as: load distribution among servers, particular applications running on a system, particular numbers of compute nodes in a cloud environment, and the presence of additional types of nodes (e.g., elastic nodes, middle tier nodes) in a cloud environment. The candidate topology may be associated with another entity associated with a same enterprise, such as a different division of a large company. Alternatively, the candidate topology may be associated with the same type of division of a different enterprise, such as two cloud computing environments associated with two different manufacturing companies, or two different software-type companies. The candidate topology may be a topology template that is not based on a historical topology of an actual organization. For example, a set of candidate topologies may include a topology template associated with a lower level of data security and another topology template associated with a higher level of data security.

According to one or more embodiments, the candidate topology includes user-defined topology elements. For example, a user may generate a runbook to remediate an event. In the process of generating the runbook, the user may generate a set of labels or tags specifying event properties and topological elements associated with the runbooks. The tags may include a name of the event, system components associated with runbook operations, system applications associated with runbook operations, and relationships among the components. The system may identify a candidate topology defined by the user-generated tags associated with the user-generated runbook. In addition, a user may generate tags to specify event properties and topological elements associated with an existing runbook. For example, if a gateway device in a system is updated to a newer model, a system administrator may delete or modify tags of a runbook associated with the previous model of the gateway device to ensure the system presents the runbook to remediate events associated with the newer model of the gateway device.

According to one or more embodiments, the system may combine user-generated tags with system-generated tags or data. For example, a user may generate a pair of tags associated with a pair of system components. The system may identify a relationship between the components. The system may identify the relationship between the components without receiving user input to direct the system to identify the relationship. The system may generate a new tag based on the identified relationship. For example, a user may generate tags "Server A" and "Database A." The system may identify the database as being the object of queries generated by the server. The system generates a tag to specify the database is in communication with the server. The system may generate another tag to specify that database stores data accessed by queries from the server. The system may identify the candidate topology based on the combination of user-generated tags and system-generated tags.

The system compares the system topology of the monitored system with the candidate topology to determine whether a similarity criterion is met (Operation 208). The similarity criterion may include, for example, determining that a threshold percentage of topology elements is the same between the system topology and the candidate topology. The system may perform a comparison on a predetermined number of candidate topologies to identify the candidate topology having the highest similarity with the system topology. For example, the system may identify three different candidate topologies, among a set of hundreds of candidate topologies, which meet a threshold similarity criterion with the system topology. The system may identify, among the three candidate topologies, the candidate topology having the highest similarity with the system topology.

Based on determining that a candidate topology meets a similarity criterion with the system topology, the system identifies a runbook associated with the candidate topology (Operation 210). For example, the system may determine that the runbook was previously executed in a system having a topology similar to the system topology. The system may further determine that the runbook was executed in the candidate system associated with the same type of event as the event detected in the monitored system.

The system presents the runbook to diagnose a cause of the event and/or remediate the event detected in the monitored system (Operation 212). For example, the system may provide a user interface element on a graphical user interface to allow a user to select a runbook. Selecting the runbook may result in displaying one or more user interface elements associated with independently executable operations corresponding to steps of the runbook. According to one or more embodiments, the system may identify multiple topologies meeting the similarity criteria. The system may present the runbook associated with the candidate topology that has the highest similarity to the system topology. The system may rank a plurality of runbooks associated with a plurality of candidate topologies based on the degree to which the candidate topologies are similar to the system topology. The system may present, via a GUI, a predefined number of the candidate runbooks to remediate the event. The system may rank the candidate runbooks based on the degree to which the candidate topologies are similar to the system topology. For example, the system may display a candidate runbook associated with a topology having a highest similarity ranking above a candidate runbook associated with a topology having a next-highest similarity ranking.

According to one or more embodiments, presenting the runbook to diagnose a cause of an event and/or remediate the event may include displaying information about why the candidate runbook meets the similarity criteria. For example, the system may information about the candidate topology, such as, "Candidate topology includes nodes A, B, and C connected to device X." The system may display, via text or via visual elements (without text) representing components of the system topology and/or components of the candidate topology.

According to one or more embodiments, the system may include additional criteria, in addition to determining whether a similarity criterion is met between a candidate topology and the system topology, to determine whether to present a particular runbook to diagnose a cause of an event and/or remediate an event. For example, the system may determine whether similarity criteria are met between the detected event, and an event associated with a particular runbook. In other words, the system may select a runbook to present to remediate an event based on both (a) a similarity of the detected event with an event associated with the runbook, and (b) a similarity of a topology associated with the detected event and a topology associated with the runbook. According to one or more embodiments, the system identifies topological and event-based relationships by collecting metadata associated with a detected event. Metadata includes, for example, a user ID, time, device ID, application ID, application type, port numbers associated with an event, power sources associated with a device, communication channel types, communication protocols, encryption types, data types, and data content (e.g., whether data associated with an event is associated with an operating system (OS) or an application running on the OS, whether data associated with an event is associated with a particular tenant of cloud-based environment, etc.).

Figure 3:
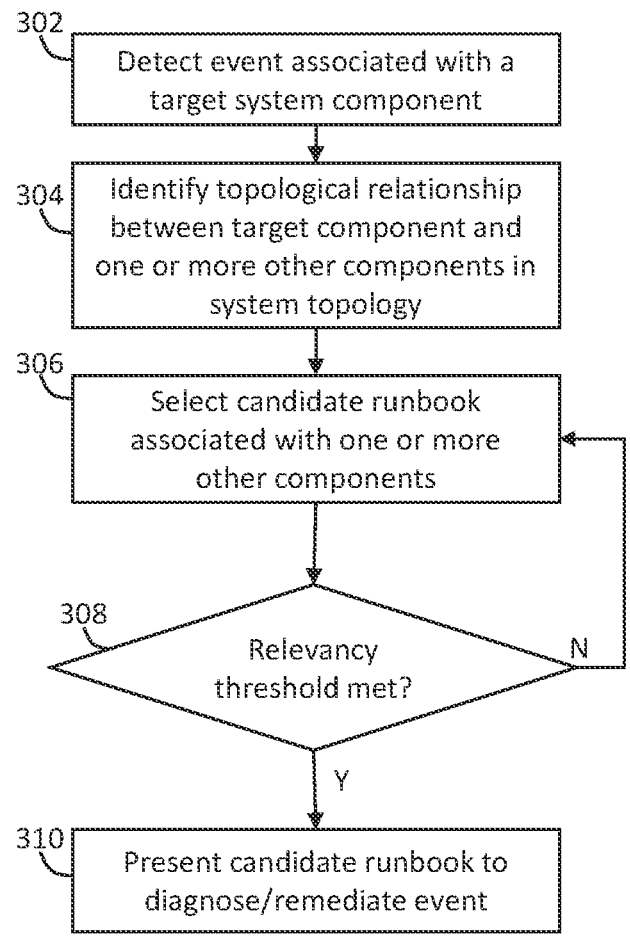
FIG. 3 illustrates an example set of operations for recommending a runbook to execute to diagnose and/or remediate an event based on a topology data associated with the runbook in accordance with one or more embodiments.

FIG. 3 illustrates another example set of operations for recommending a runbook for diagnosing a cause of an event and/or remediating an event based on a relationship between a target component in a system topology and one or more additional components in the system topology in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

A system may include one or more monitoring devices and monitoring applications. The system detects, by the monitoring devices and/or applications, an event associated with a target component in the monitored system (Operation 302). For example, the system may identify values or events in an event log associated with a component being monitored by a monitoring application. The event log may identify: sensor values, data throughput values, data storage values, application states, and access events, such as identifying requests from entities to access applications or devices. According to one example embodiment, the system identifies anomalous sensor values or anomalous application states that are outside threshold values for a correctly-operating state of a target component. According to another example embodiment, the system detects an access request to access a system component from an entity that is not authorized to access the system component. In one example, embodiment, the system may detect a successful access attempt by an unauthorized or unrecognized entity.

The system identifies a topological relationship between the target component and one or more other components in the system topology (Operation 304). The system topology describes physical system components, such as computing devices, communication channels connecting the computing devices, power channels supplying power to the computing devices, applications running on the computing devices, and data stored in the computing devices. The system topology describes relationships among different components, such as how components are connected by communication channels, which components are directly connected to each other and which components are indirectly connected along the same communication paths, which components rely on other components to function, and which software-type components may be running on hardware-type components.

Identifying the topological relationship between the target component and one or more other components in the system topology may include identifying the types of components, functions of the components, and communication connections of the components with other components in a system. For example, the system may identify a topological relationship between a database application and the hardware on which the database application is running. As another example, the system may identify a topological relationship between two virtual machines connected to different client terminals and running different applications from a same server. The topology may further identify access authorization for particular system components, such as which entities have authorization to access different system hardware and software. The system topology may be stored in a data repository. The stored system topology may be updated based on changes in the system topology. According to an alternative embodiment, a system may detect a system topology in real-time or on demand, when an event is detected in the monitored system.

The system selects a candidate runbook associated with one or more components in the system topology (Operation 306). The candidate runbook may be selected from among a set of stored runbooks. For example, a system may maintain tens, hundreds, or thousands of runbooks associated with different routine processes associated with events in the system.

According to one or more embodiments, the system collects metadata associated with an event to identify the target component and one or more additional components in the system topology. The system may select candidate runbooks based on the collected metadata. For example, metadata collected by the system may include a user ID of a user associated with a target component, an organization name or tenant associated with one or more components, a device ID of one or more devices associated with the target component, application information, such as an application name, application run state (such as whether the application was executing properly or was stalled or not responding), a process being performed by an application at the time of the event, an application type, port numbers associated with the event, power sources associated with the event, communication channel types of communication channels associated with the event, communication protocols, encryption types, data types, and data content (e.g., whether data associated with an event is associated with an operating system (OS) or an application running on the OS associated with the event.

The system determines whether the selected candidate runbook meets a threshold level of relevancy based on the topological relationship between the target component and the one or more components associated with the candidate runbook (Operation 308). According to one embodiment, the system may determine how closely the one or more components are in communication with the target component. For example, if the system detects an event, "server crash," the system topology may identify a first set of system components in communication with the server and a second set of system components that operate independently of the server and that would not be affected by the server crash. Identifying the topological relationship between the target component and the one or more other components includes determining whether the one or more components associated with the candidate runbook belong to the first set of system components (in communication with the server) or the second set of system components (not in communication with the server). The system may determine that, if the one or more components belong to the first set of system components, the candidate runbook meets the threshold relevancy level to the target component. Conversely, the system may determine that, if the one or more components belong to the second set of system components, the candidate runbook fails to meet the threshold relevancy level.

According to one or more embodiments, the system may determine whether a candidate runbook meets the threshold relevancy level based on degrees of communication between a target component and one or more other components associated with the candidate runbook. For example, in the example above, in which the system detects an event, "server crash," the system may determine whether components associated with runbook operations in the candidate runbook are among a first set of components that are in direct communication with the server (first degree of communication), among a second set of components that are in direct communication with one of the first set of components (second degree of communication), or among a third set of components in direct communication with one of the second set of components (third degree of communication), etc. The system may assign a highest relevancy score to a candidate runbook associated with the first set of components, a next-highest relevancy score to a candidate runbook associated with the second set of components, and a lowest relevancy score to a candidate runbook associated with the third set of components.

Based on determining that the candidate runbook meets the threshold level of relevance, the system presents the runbook to diagnose a cause of the event and/or remediate the event detected in the monitored system (Operation 310). For example, the system may provide a user interface element on a graphical user interface to allow a user to select a runbook. Selecting the runbook may result in displaying one or more user interface elements associated with independently executable operations corresponding to steps of the runbook.

According to one or more embodiments, the system may identify multiple candidate runbooks that meet the threshold relevancy to the event. The system may present the candidate runbook having a highest relevancy score based on the topological relationship between a target component and one or more components associated with operations of the candidate runbook. The system may rank a plurality of candidate runbooks based on the relevancy scores of the candidate runbooks. The system may present, via a GUI, a predefined number of the candidate runbooks to remediate the event. The system may display the ranked candidate runbooks based on their ranking. For example, the system may display a candidate runbook having a highest relevancy score above a candidate runbook having a next-highest relevancy score.

According to one or more embodiments, presenting the candidate runbook to remediate the event may include displaying information about relationships between the target component and one or more components associated with operations of the runbook that contribute to the relevancy score. The system may display, via text or via visual elements (without text) representing components of the system topology, that "X number of components associated with the operations of the candidate runbook are present in the system topology." Alternatively, the system may display, via text or via visual elements (with or without text) representing components of the system topology, that "X components associated with operations of the candidate runbook have Y degree of communication with a target component associated with the event."

Figure 4:
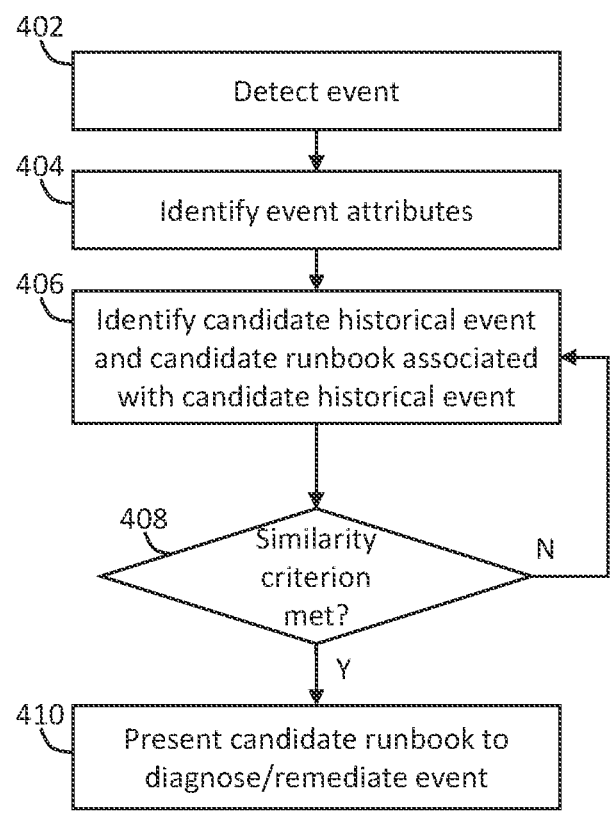
FIG. 4 illustrates an example set of operations for recommending a runbook to diagnose and/or remediate an event based on event attributes in accordance with one or more embodiments.

5. Event-Based Recommendation of Runbooks for Event Diagnosis and Remediation FIG. 4 illustrates an example set of operations for recommending a runbook for diagnosing a cause of an event and/or remediating an event based on a runbook associated with another event, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

A system may include one or more monitoring devices and monitoring applications. The system detects, by the monitoring devices and/or applications, an event associated with a monitored system (Operation 402). For example, the system may identify values or events in an event log associated with a monitoring application. The event log may identify: sensor values, data throughput values, data storage values, application states, and access events, such as identifying requests from entities to access applications or devices. According to one example embodiment, the system identifies anomalous sensor values or anomalous application states that are outside threshold values for a correctly-operating state. According to another example embodiment, the system detects an access request to access a system component from an entity that is not authorized to access the system component. In one example, embodiment, the system may detect a successful access attempt by an unauthorized or unrecognized entity.

The system identifies event attributes associated with the event (Operation 404). Identifying event attributes may include collecting and analyzing metadata associated with an event. For example, in an embodiment in which the event is detected when a user generates a ticket describing a particular component in the system, the system may review log data associated with the component. The log data may identify users, applications, and states associated with the component over a predefined period of time. According to another example embodiment in which the system detects the event by monitoring sensor data or state data of system components, identifying event attributes may include identifying recent historical sensor data or state data, identifying applications associated with target components, and identifying users associated with target components.

According to an example embodiment, metadata collected by the system may include a user ID of a user associated with the event, an organization name or tenant associated with the event, a timestamp, a device ID of one or more devices associated with the event, application information, such as an application name, application run state (such as whether the application was executing properly or was stalled or not responding), a process being performed by an application at the time of the event, an application type, port numbers associated with the event, power sources associated with the event, communication channel types of communication channels associated with the event, communication protocols, encryption types, data types, and data content (e.g., whether data associated with an event is associated with an operating system (OS) or an application running on the OS associated with the event.

The system identifies a candidate historical event and a candidate runbook associated with the candidate historical event (Operation 406). A candidate historical event may be selected from among a set of stored historical events. For example, each time a user authors a ticket reporting an event, the system may store the event and metadata associated with the event. Similarly, each time the system detects an event based on sensor data, the system may store the event and metadata associated with the event. According to another example embodiment, each time the system detects a particular component state, such as an unresponsive application or a component operating outside a threshold operating range, the system may store metadata associated with the detected event. In addition, each time a runbook is applied to an event, the system may store the runbook in association with the event or the event type. According to one example embodiment, the system may obtain feedback from a user of a runbook to determine whether the runbook successfully resolved the event. If the runbook successfully resolved the event, the system may store the runbook in association with the event. If the runbook did not successfully resolve the event, the system may refrain from storing the runbook is association with the event. According to an alternative embodiment, the system may store a plurality of runbooks in association with an event. The system may increase a ranking of one of the plurality of runbooks based on (a) the runbook being selected to remediate the event, and/or (b) the runbook successfully remediating the event. The system may decrease the ranking of one of the plurality of runbooks based on (a) the runbook not being selected to remediate an event, and/or (b) the runbook being selected, but unsuccessful at remediating the event.

The system determines whether the candidate historical event meets a similarity criterion with the detected event (Operation 408). For example, the system may compare metadata associated with the detected event with metadata associated with the candidate event.

The similarity criterion may include, for example, determining that a threshold percentage of metadata elements is the same between the detected event and the candidate event. The system may perform a comparison on a predetermined number of candidate events to identify the candidate event having the highest similarity with the detected. For example, the system may identify three different candidate events, among a set of hundreds of candidate topologies, which meet a threshold similarity criterion with the detected. The system may identify, among the three candidate events, the candidate event having the highest similarity with the detected event.

For example, the system may detect an event associated with a name "communication with server lost." The system may identify three candidate events that meet a similarity criterion. A first event may relate to a power loss to a particular server. A second event may relate to a misprogrammed communication port caused by an application running on the server. A third event may relate to a communication failure of a device along a communication channel between a server and a user terminal. The system may analyze metadata associated with the detected event including: power levels to a server, applications running on the server, and the presence and/or status of a device along a communication channel between a server and a user terminal. The system may select the second candidate event as having the highest similarity with the detected event based on determining, from the metadata associated with the events, that the same application was running on a target server associated with the detected event and the server associated with the candidate event.

Based on determining that a candidate event meets a similarity criterion with the detected event, the system presents the candidate runbook associated with the candidate event to diagnose a cause of the event and/or remediate the detected event (Operation 410). For example, the system may provide a user interface element on a graphical user interface to allow a user to select a runbook. Selecting the runbook may result in displaying one or more user interface elements associated with independently executable operations corresponding to steps of the runbook.

While FIGS. 2-4 illustrate example operations for selecting and presenting runbooks to remediate a detected event based on system topology and attributes of detected events, one or more embodiments combine elements of FIGS. 2-4 to select a runbook to present to remediate a detected event. For example, one or more embodiments include selecting a runbook to present to remediate an event based on any combination of: (a) a similarity of a topology associated with a system associated with a detected event and a candidate topology, (b) a similarity of topological components associated with operations of a candidate runbook and a topology associated with a detected event, and (c) a similarity of a detected event with a similarity of an event associated with a particular runbook.

6. Previewing Runbook Operations to Recommend Candidate Runbook

Figure 5:
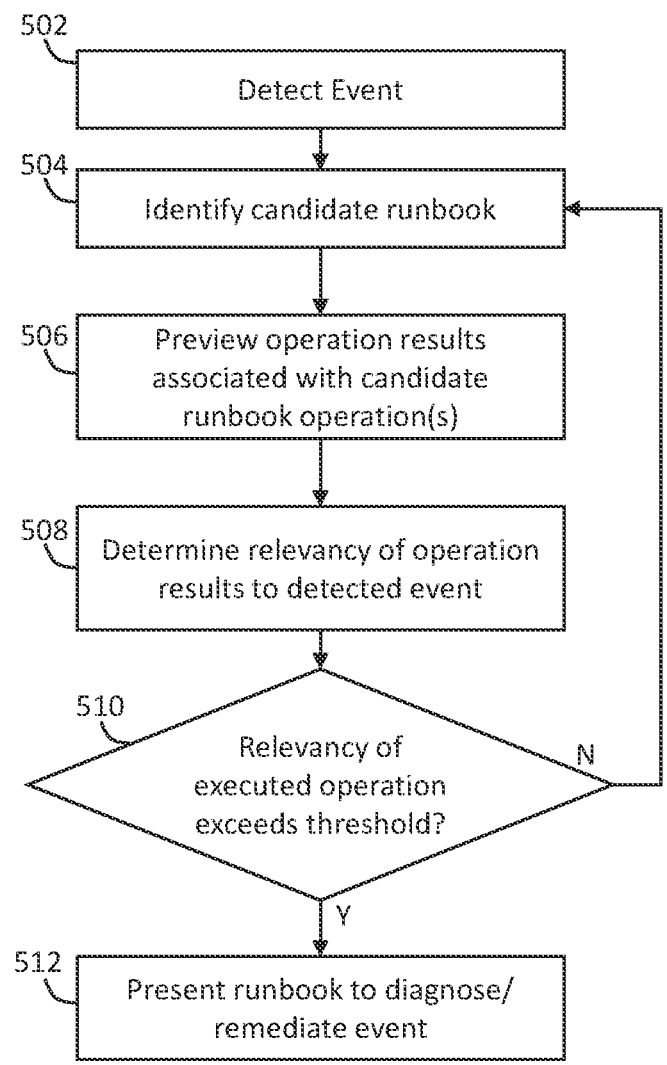
FIG. 5 illustrates an example set of operations for previewing runbook operations to recommend a runbook for diagnosing/remediating an event in accordance with one or more embodiments.

FIG. 5 illustrates an example set of operations for recommending a candidate runbook based on a relevance of results of a runbook operation to remediation of an event in accordance with one or more embodiments. One or more operations illustrated in FIG. 2 may be modified, rearranged, or omitted all together. Accordingly, the particular sequence of operations illustrated in FIG. 5 should not be construed as limiting the scope of one or more embodiments.

A system may include one or more monitoring devices and monitoring applications. The system detects, by the monitoring devices and/or applications, an event associated with a monitored system (Operation 502). For example, the system may identify values or events in an event log associated with a monitoring application. The event log may identify: sensor values, data throughput values, data storage values, application states (e.g., "OK," and "not responding"), and access events, such as identifying requests from entities to access applications or devices. According to one example embodiment, the system identifies anomalous sensor values or anomalous application states that are outside threshold values for a correctly-operating state. According to another example embodiment, the system detects an access request to access a system component from an entity that is not authorized to access the system component. In one example, embodiment, the system may detect a successful access attempt by an unauthorized or unrecognized entity.

According to one or more embodiments, detecting an event includes analyzing predictions generated by a machine learning model that monitors sensor data and other system data. According to one or more alternative embodiments, detecting an event includes analyzing a user-generated event entry, such as a "ticket" generated by one user to inform one or more additional users, such as technicians trained to maintain a system, of an anomaly. The ticket may be based on a user complaint (e.g., "a computer is not working"). Alternatively, the ticket may be based on system-detected data (e.g., sensors monitoring a component indicate the component is operating outside a threshold range of values). According to one or more embodiments, detecting an event includes comparing log entries to known or predicted anomalies. For example, a failure to log in to an application or device may be detected based on a log entry generated by the application or device. The system may analyze the log entry, identify an event (e.g., log-in failure) based on the log entry, and collect system metadata associated with the event. System metadata may include related log entries (e.g., previous log-in failures originating from the same device), user information, application information, device information, communication protocols, and security protocols.

The system identifies a candidate runbook (Operation 504). The candidate runbook may be selected from among a set of stored runbooks. For example, a system may maintain tens, hundreds, or thousands of runbooks associated with different routine processes associated with events in the system. According to one embodiment, the system identifies attributes associated with the event or the system topology to identify the runbook. For example, the system may identify a name associated with an event, such as a name entered by an operator to report the event. Alternatively, the system may identify a system component in the system topology associated with the event. For example, if the event includes a particular status of a component, the candidate runbook may be associated with the component or another component in the system topology.

According to one or more embodiments, the system collects metadata associated with an event. The system may identify candidate runbooks based on the collected metadata. For example, metadata collected by the system may include a user ID of a user associated with the event, an organization name or tenant associated with the event, a timestamp, a device ID of one or more devices associated with the event, application information, such as an application name, application run state (such as whether the application was executing properly or was stalled or not responding), a process being performed by an application at the time of the event, an application type, port numbers associated with the event, power sources associated with the event, communication channel types of communication channels associated with the event, communication protocols, encryption types, data types, and data content (e.g., whether data associated with an event is associated with an operating system (OS) or an application running on the OS associated with the event.

Prior to presenting a candidate runbook to diagnose and/or remediate an event, the system previews one or more operations of the candidate runbook. The system executes one or more operations associated with steps of the candidate runbook to obtain a set of results (Operation 506). The one or more operations may either be (a) operations specified in a step of the candidate runbook, or (b) operations that are not specified in any step of the candidate runbook, but which provide results associated with the steps of the candidate runbook.

For example, a candidate runbook may include a step that describes an operation to "check data transmission logs." The system may, prior to presenting the candidate runbook as a recommendation to remediate an event, perform the operation specified in the runbook to check the data transmission logs. The system may compare the values described in the data transmission logs expected values to obtain results associated with the operation. In addition, or in the alternative, the system may perform an operation related to one of the steps of the candidate runbook, but that is not specified in any of the steps of the candidate runbook. For example, if the candidate runbook includes the operation to "check data transmission logs of server," the system may perform an operation to check a status of a data routing device between the server and a user terminal. The system may obtain results of checking the status of the data routing device between the server and the user terminal, such as whether the device was transmitting data during the detected event or whether data transmission was interrupted during the detected event.

According to one or more embodiments, the system selects one or more operations, from among the independently-executable operations of a candidate runbook, to perform based on one or both of event data associated with a detected event and topology data associated with the detected event. For example, if a detected event is assigned a name "login attempt failure," the system may analyze event data to identify the time of the event, an ID of the server running an application on which the login attempt was made, and applications running on the server. The system may analyze the system topology to identify components in the monitored system in communication with the server running an application on which the login attempt was made. The system may identify a set of candidate runbooks associated with an event type "login attempt failure." The system may select operations to perform in connection with one or more of the candidate runbooks based on the event data and topology data. For example, the system may perform, based on the obtained event data, an operation associated with an independently-executable operation of a candidate runbook to "check authorization level required by application." According to another example, the system may perform, based on the obtained system topology data, an operation associated with an independently-executable operation of another candidate runbook to "check status of gateway in communication with server."

According to one or more embodiments, the system identifies candidate operations to preview based on analyzing metadata. For example, the system may store metadata for each operation of a runbook indicating whether the particular operation is eligible to be performed to preview operation results. The system may designate an operation as being eligible for execution to preview runbook results based on (a) the operation itself may be performed or (b) another operation, different from the runbook operation, may be performed to provide an insight into the runbook operation. An example of an operation that may be performed to preview operation results is an operation that may be performed by a computer, without user input. In contrast, an example of an operation that may be ineligible for previewing operation results is an operation that requires user input to perform. The metadata associated with a runbook operation may also identify one or more related operations that may be performed to preview the runbook operation. For example, if an operation directs a user to check a power connection to a server, the metadata may specify that a computer may preview the operation by determining whether the server is actively communicating with another server.

According to another example embodiment, the system may designate an operation as being ineligible for execution to preview runbook operation results based on performance of the operation changing a state of the system. For example, a runbook operation may direct a user to initiate a data backup, restore backed-up data, initiate a series of requests to a server, or reset a virtual firewall. Performance of the operations to preview results may result in the system state changing. Accordingly, the system may store metadata associated with the runbook operations indicating the operations are ineligible for execution for purposes of obtaining a preview of the operation results.

Based on the results of the executed operations the system determines whether the executed operations generate an interesting result (Operation 508). The system represents whether a particular operation result is interesting using a relevancy score. The system determines a relevance of an operation of a candidate runbook to diagnosing and/or remediating the detected event and assigns a corresponding relevancy score to the operation. According to one or more embodiments, the system analyzes information associated with results of a set of one or more operations associated with a runbook to an operation to calculate a relevancy score for the runbook. Examples of information the system may analyze to generate the relevancy score include: a dataset that is to be used to execute an operation specified in the runbook, a type of data included in a set of results, a source of the operation results, a software and/or hardware component analyzed in the operation results, and an indication of whether a type of issue identified by the operation results is an issue detected in a target component or environment affected by the event.

For example, a candidate runbook may include a step that describes an operation to "check data transmission logs." The system obtains a set of results by performing an analysis of the data transmission logs by comparing actual values to expected values. Based on the results of the comparison, the system assigns a relevancy score to the candidate runbook or adjusts a relevancy score of the candidate runbook. If the system determines that the results of the operation do not provide a useful result for remediating the detected event, the system may reduce the relevancy score for the candidate runbook. For example, if the data transmission logs show continuous data transmissions within threshold ranges, the system may determine that checking the data transmission logs is unlikely to remediate a detected event. Accordingly, the system reduces a relevancy score of the associated candidate runbook. On the other hand, if system determines that the data transmission log values are not within an expected threshold range of values, the system may increase the relevancy score of the candidate runbook, indicating that the operation to check the data transmission logs may be likely to remediate a detected event. The system may determine the relevancy score for a candidate runbook based on a plurality of relevancy scores associated with a plurality of operations associated with steps of the candidate runbook. For example, if three operations associated with steps of the candidate runbook are determined to be relevant to remediating an event, and if one operation associated with a step of the candidate runbook is determined not to be relevant to remediating the event, the system may generate a relevancy score of 0.75 (on a scale from 0 to 1).

According to another example, if the candidate runbook includes the operation to "check data transmission logs of server," the system may perform an operation to check a status of a data routing device between the server and a user terminal. The system may obtain results of checking the status of the data routing device between the server and the user terminal, such as whether the device was transmitting data during the detected event or whether data transmission was interrupted during the detected event. If the system determines that the data routing device was sending and receiving data according to expected data transmission rates, the system may reduce a relevancy score for the candidate runbook, indicating that checking the data transmission logs of the server is unlikely to contribute to remediating the detected event. Conversely, if the system determined that the data routing device was not sending and receiving data to and from the server according to expected data transmission rates, the system may increase a relevancy score for the candidate runbook, indicating that checking the data transmission logs of the server may be likely to contribute to remediating the detected event.

The system may obtain expected results for comparison with presently-generated results based on previously-collected system data, published specifications, previously-executed runbook results, and user-provided expected values. For example, a cloud computing system may include a monitoring platform to monitor system attributes. The monitoring system may identify operating parameters, such as data transfer rates, bandwidth utilization, memory utilization, and applications running, that correspond to an expected operating state. For example, the monitoring system may determine that a data transfer rate between two servers that is less than a particular value corresponds to the expected data transfer range. A data transfer rate that exceeds the particular value may correspond to an anomalous value. According to one example embodiment, the monitoring platform includes a machine learning model trained to receive system metrics and generate one or more predictions indicating whether the system metrics are within expected ranges or anomalous. Alternatively, a user may assign tags or labels to particular values or sets of values, indicating whether the values are anomalous or within expected ranges. In addition, or in the alternative, the system may detect that a user has previously executed a runbook to diagnose and/or remediate an event based on detecting a particular set of anomalous values.

The system may set a relevancy score for a candidate runbook based on results of one operation or many operations. For example, if the system executes one operation associated with a step of a candidate runbook, the system sets the relevancy score for the candidate runbook based on the results of the one operation. Alternatively, the system may combine multiple relevancy scores for multiple operations associated with steps of the candidate runbook to determine a composite relevancy score for the entire candidate runbook. The system may assign each operation a relevancy score between 0 and 1. The system may average the relevancy scores associated with multiple operations to determine the relevancy score for the candidate runbook. Alternatively, the system may assign different weights to different relevancy scores of operations associated with runbook steps to determine the composite relevancy score for the candidate runbook.

The system may generate a relevancy score associated with operation results based on (a) whether the results vary from expected ranges, and (b) a relationship between the results and a goal associated with the runbook recommendation. The system may assign a higher relevancy score to an operation that is more closely related to a goal of recommending a runbook than to an operation that is not closely related to a goal of the runbook recommendation. For example, the system may identify a target component in which the detected event occurred. The system may identify diagnosing the detected event in the target component as the goal of recommending the runbook. In other words, the purpose of recommending a runbook is to provide a user with a runbook that is likely to diagnose and/or remediate a detected event. The system may analyze two runbook operations. One runbook operation may be directed to analyzing data stored in the target component. Another operation may be directed to analyzing data stored in another component in the system that is not connected to the target component. The system may determine, based on topological data associated with the two runbook operations, that the first operation is more closely related than the second operation to a goal of the runbook. The system may assign a higher relevancy score to the results associated with the first operation than to the second operation.

According to one or more embodiments, the system identifies how closely runbook operation results are associated with a goal of a runbook recommendation based on one or both of (a) event data and (b) topological data associated with the detected event. For example, if the system determines that a goal of a runbook recommendation is to diagnose a cause of an application crash, the system may determine that runbook operations that analyze data related to a state of the application at the time of the application crash are more interesting than runbook operations that analyze states of the application at a time more remote from the time of the crash. The system assigns higher relevancy scores to runbook operations that generate data more closely related to event data than to runbook operations that generate data more remotely related to event data. Likewise, the system assigns higher relevancy scores to runbook operations that analyze a target component in which an event occurred than to runbook operations that analyze components remote from the target component in a system topology.

For example, if the system performs two operations associated with steps of a candidate runbook, the system may assign a relatively low relevancy score to a first runbook operation based on determining: (a) the results of the first runbook operation are within an expected range (corresponding to a low relevancy score), and the first operation is associated with a component in the system topology that is not closely related to a target component (corresponding to a low relevancy score), and (b) the results of the second operation are outside an expected range (corresponding to a high relevancy score), and the second operation is associated with a component in the system topology that is closely related to a target component (corresponding to a high relevancy score).

According to one or more embodiments, the system may generate the relevancy score based on the results of operations, executed by the system, associated with one or more steps of a candidate runbook, and one or more of: (a) a similarity of a detected event with an event associated with the candidate runbook, and (b) a similarity of a topology associated with the detected event and a topology associated with the candidate runbook. According to one or more embodiments, the system identifies topological and event-based relationships by collecting metadata associated with a detected event. Metadata includes, for example, a user ID, time, device ID, application ID, application type, port numbers associated with an event, power sources associated with a device, communication channel types, communication protocols, encryption types, data types, and data content (e.g., whether data associated with an event is associated with an operating system (OS) or an application running on the OS, whether data associated with an event is associated with a particular tenant of cloud-based environment, etc.).

The system determines whether the relevancy score associated with the candidate runbook exceeds a threshold (Operation 510). For example, the system may set a threshold relevancy score at 0.6, on a scale from 0 to 1. The system may determine that a candidate runbook meets the threshold relevancy score if the relevancy score for the candidate runbook is 0.6 or greater. While a range of values between 0 to 1 for relevancy scores is provided by way of example, embodiments encompass any range of values, such as between 1-10, between 0-100, between A-E, or any other range of values. Alternatively, the relevancy scores may be binary—either 0 or 1, instead of a range of values.

According to one or more embodiments, the system repeats operations 504-510 for each runbook in a set of candidate runbooks. For example, if a detected event is assigned a label "power loss to terminal," and if ten stored runbooks are associated with the label "power loss to terminal," the system may repeat operations 504-510 for each of the ten stored runbooks. The system assigns relevancy scores to the respective candidate runbooks.

Based on determining that a candidate runbook meets a relevancy threshold, the system presents the candidate runbook to remediate the detected event (Operation 512). For example, the system may provide a user interface element on a graphical user interface to allow a user to select a runbook. Selecting the runbook may result in displaying one or more user interface elements associated with independently executable operations corresponding to steps of the runbook.

According to one or more embodiments, the system may identify multiple candidate runbooks that meet the relevancy criteria. The system may present the candidate runbook for which the relevancy scores are the highest. The system may rank a plurality of candidate runbooks based on the respective relevancy scores of the candidate runbooks. The system may present, via a GUI, a predefined number of the candidate runbooks to diagnose and/or remediate the event. The system may display the ranked candidate runbooks based on their ranking. For example, the system may display a candidate runbook having a highest relevancy score at a position on a display above a candidate runbook having a next-highest relevancy score. The system may refrain from displaying candidate runbooks that meet the threshold relevancy if the candidate runbooks are not among the predetermined number of highest-ranking candidate runbooks. For example, if the system determines that five candidate runbooks meet the threshold relevancy, the system may display the three candidate runbooks having the highest relevancy scores as recommendations for remediating the event. The system may refrain from displaying the other two candidate runbooks.

According to one or more embodiments, presenting the candidate runbook to remediate the event may include displaying information about why the candidate runbook meets the relevancy threshold. For example, the system may display a plurality of candidate runbooks according to the degree to which the operations executed by the system associated with steps of the candidate runbooks indicate results likely to provide information relevant to remediating a detected event, as discussed above. The system may display, via text or via visual elements (without text) representing steps of the candidate runbook, that one or more steps defined in the candidate runbook are likely to provide information relevant to remediating the detected event.

7. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims.

Figure 6:
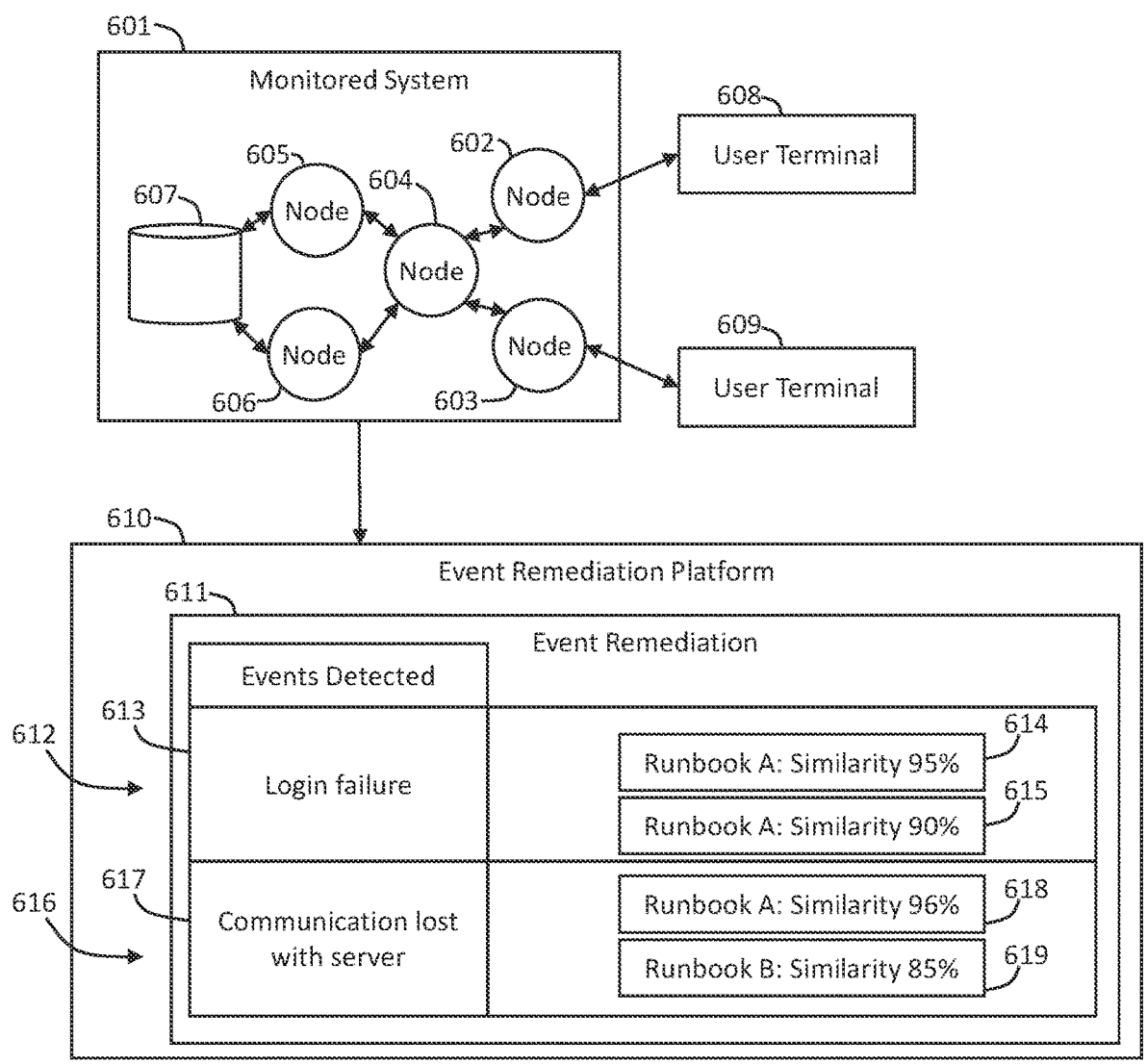
FIG. 6 illustrates an example embodiment of recommending runbooks to diagnose/remediate an event.

FIG. 6 illustrates a monitored system 601 that is monitored by an event remediation platform 610. The monitored system 601 includes nodes 602-506 and a database 607. User terminals 608 and 609 access the nodes 602-606 and the database 607 via a network. The event remediation platform 610 monitors the system 601 to identify events associated with the system 601.

In the example embodiment illustrated in FIG. 6, the event remediation platform 610 detects a login failure and an error in which communication was lost to a server. For example, a user may interface with the user terminal 608 to access an application running on the node 604. The node 604 may communicate with the user terminal 608 via node 602. The nodes 602 and 604 may include hardware servers. A user may attempt to log in to the application on the node 604. The system may detect a predefined number of login failures, such as three consecutive login failures from the user terminal 608 and generate an event notice 612. The system displays the detected event 613, together with recommended runbooks to remediate the event 614 and 615, on a display screen 611. The user interface elements 614 and 615 representing runbooks may be user-selectable elements. Selecting the elements 614 or 615 may cause the system to modify the displayed data to include steps of the respective runbook 614 or 615.

In addition, in the example embodiment illustrated in FIG. 6, an operator may generate a ticket indicating that communication was lost to a server represented by node 606. For example, an operator attempting to access the database 607 via node 606 may determine that requests are not being answered. Based on the operator generating the ticket, the system generates an event notice 616. The system displays the detected event 617, together with recommended runbooks to remediate the event 618 and 619, on the display screen 611. The user interface elements 618 and 619 representing runbooks may be user-selectable elements. Selecting the elements 618 or 619 may cause the system to modify the displayed data to include steps of the respective runbook 618 or 619.

The system identifies the runbooks 614, 615, 618, and 619 to display based on determining that one or both of an event and/or a topology associated with the event meet a threshold similarity to one or both of a candidate historical event and/or a candidate topology. For example, the system may identify the type of operating system and application that a user is attempting to access in the node 604. The system may recommend the runbook 614 based on determining that the runbook is associated with a topology that includes the same OS and the same application, as well as an intervening node, similar to node 602. The system may recommend the runbook 615, having on a lower similarity value (i.e., 90%), based on determining that a topology associated with the runbook 615 includes the same OS and application, but a different type of intervening node that is different than the type of node 602.

The system may identify attributes associated with the event 617, including a time at which the event occurred, a power supply specification for power provided to the node 606, communication port configurations of the node 606, and communication channel protocols. The system may recommend the runbook 618 based on determining that the runbook 618 is associated with another event that included the same port configurations, communication channel protocols, and power configuration as the node 606. The system may recommend the runbook 619, having on a lower similarity value (i.e., 85%), based on determining that the event includes the same port configurations and communication channel protocols, but a different power configuration as the node 606.

In the example embodiment, a system may store hundreds of runbooks associated with tens of different events. Based on detecting and displaying the event 617 "communication lost with server," the system may identify ten candidate runbooks, from among the hundreds of stored runbooks, associated with an event type "communication lost with server."

The system may analyze event attributes and/or topology characteristics associated with the candidate runbooks to identify which runbooks to recommend for diagnosing and/or remediating the presently-displayed event. For example, the system may determine that four of the candidate events are characterized by a server running different communication protocols than the server associated with the presently-detected event. The system may further determine that two of the remaining candidate runbooks relate to system components that are not present in the topology associated with the presently-detected event. Among the remaining four candidate runbooks, the system may determine that three of the candidate runbooks meet a similarity threshold to the presently-detected event. The system may identify one of the candidate runbooks as having a high effectiveness rating at successfully remediating events based on historical data tracking the success rate of the runbooks. Accordingly, the system may recommend the particular runbook that meets the similarity threshold and has a high effectiveness rating for remediating the presently-detected event.

Figure 7:
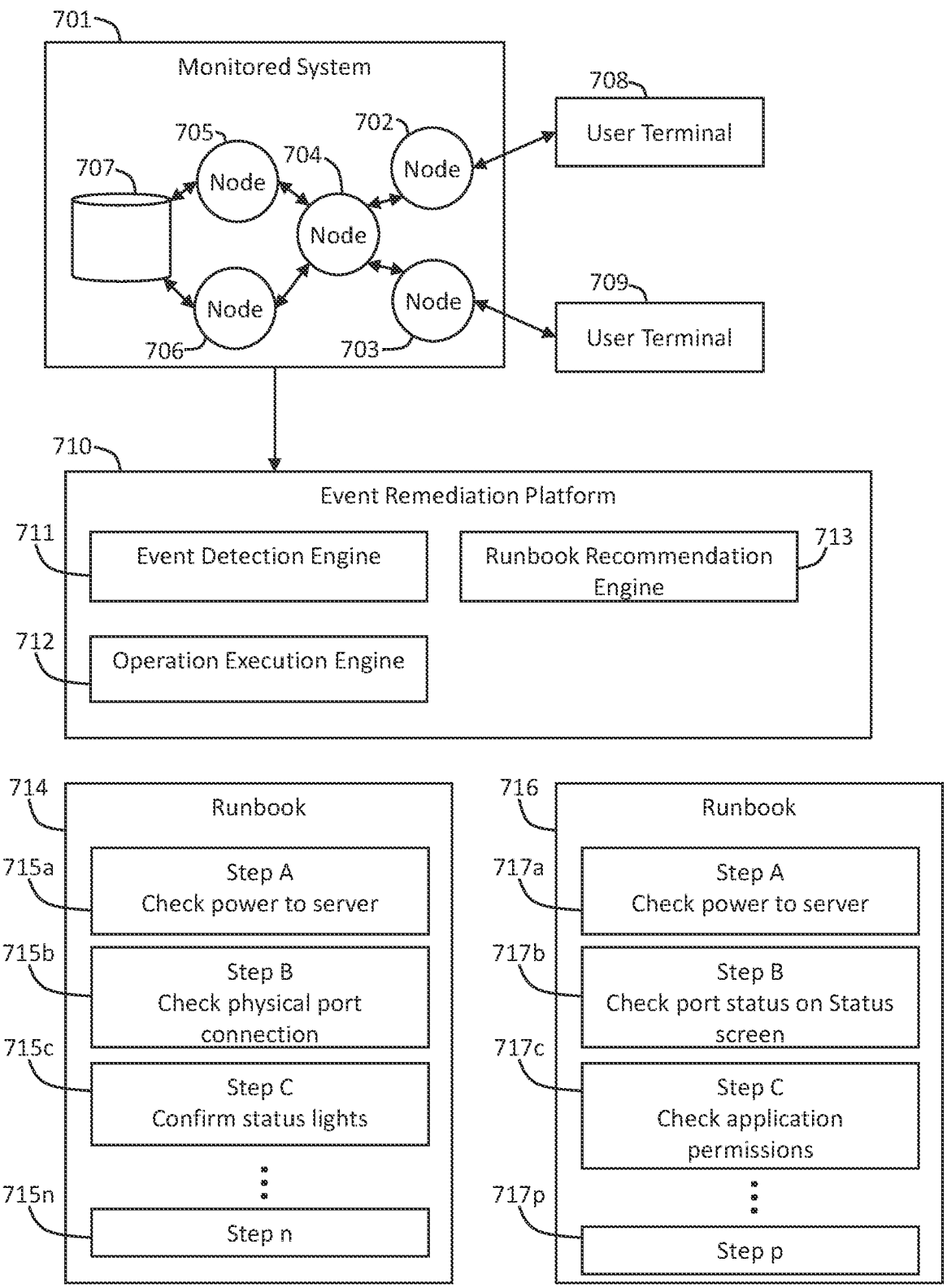
FIG. 7 illustrates another example embodiment of recommending runbooks to diagnose/remediate an event.

FIG. 7 illustrates a monitored system 701 that is monitored by an event remediation platform 710. The monitored system 701 includes nodes 702-706 and a database 707. User terminals 708 and 709 access the nodes 702-706 and the database 707 via a network. The event remediation platform 710 monitors the system 701 to identify events associated with the system 701.

In the example embodiment illustrated in FIG. 7, the event remediation platform 710 detects an error in which communication was lost to a server. For example, an operator may generate a ticket indicating that communication was lost to a server represented by node 706. For example, an operator attempting to access the database 707 via node 706 may determine that requests are not being answered. Based on the operator generating the ticket, the system identifies candidate runbooks 714 and 716 associated with an event type "communication lost to server." The system may identify the candidate runbooks 714 and 716 based on comparing event data and/or topology data with one or both of event data associated with an event to which a runbook was previously applied and a topology associated with an event to which the runbook was previously applied. For example, the system may analyze event data associated with the event type "communication lost to server" to identify the server as a server running virtual machines. The system may identify runbooks 714 and 716, from among a set of candidate runbooks associated with event types "communication lost to server," as having been applied to events in which communication was previously lost to a server running virtual machines.

Runbook 714 includes the following steps, each step associated with one or more independently-executable operations: Step A: check power to server (715a), Step B: Check physical port connection (715b), Step C: Confirm status lights (715c), up to Step n (715n). Runbook 716 includes the following steps, each step associated with one or more independently-executable operations: Step A: check power to server (717a), Step B: Check port status on status screen (717b), Step C: Check application permissions (717c), up to Step p (717p).

Prior to the runbook recommendation engine 713 generating a graphical user interface to recommend runbook 714 or runbook 716 for remediating the detected event, the operation execution engine 712 performs operations associated with one or more of the steps 715a-315n and 717a-717p. The operation execution engine 712 performs an operation associated with step 715b of the runbook 714. The operation execution engine 712 executes an operation that is different from checking a physical port connection as indicated in step 715b. Instead, the operation execution engine 712 performs an operation that indicates whether step 715b is likely to be helpful to resolve the identified event. Specifically, the operation execution engine 712 analyzes a data connection from the target server to a gateway in communication with the target server. Based on determining that the data transmissions between the target server and the gateway are within a threshold range, the event remediation platform 710 decreases a relevancy score (such as from 60/100 to 50/100) of the runbook 714, indicating that it is unlikely the checking a physical port connection in step 715b will be helpful to resolve the communication failure with the server.

The operation execution engine 712 also performs an operation indicated by step 717b of the runbook 716. The operation execution engine 712 checks the port configurations of data ports of the target server. Based on determining that the port configurations do not match expected port configurations, the event remediation platform 710 increases a relevancy score (such as from 60/100 to 75/100) of the runbook 716, indicating that checking the port status on a Status screen, specified in step 717b, may be helpful to resolve the communication failure with the server. The operation execution engine 712 also performs an operation indicated by step 717c of the runbook 716. The operation execution engine 712 checks application permissions of an application running on the target server. Based on determining that the application permissions may limit communication to external devices, the event remediation platform 710 increases a relevancy score (such as from 75/100 to 85/100) of the runbook 716, indicating that checking the application permissions, specified in step 717c, may be helpful to resolve the communication failure with the server.

The runbook recommendation engine 713 presents one or more runbooks as recommendations to remediate the detected event. In the example illustrated in FIG. 7, the runbook recommendation engine 713 presents runbook 716 as a recommendation to remediate the server communication failure, based on determining that the relevancy score (85/100) exceeds a threshold relevancy score (60/100). The runbook recommendation engine 713 also presents runbook 716 as a recommendation to remediate the server communication failure, based on determining that the relevancy score (85/100) is higher than a relevancy score of any other candidate runbook. The runbook recommendation engine 713 refrains from presenting runbook 714 as a recommendation to remediate the server communication failure, based on determining that the relevancy score (60/100) of the runbook 714 does not meet the threshold relevancy score (60/100).

In the example embodiment, a system may store hundreds of runbooks associated with tens of different events. Based on detecting the event "communication lost with server," the system may identify ten candidate runbooks, from among the hundreds of stored runbooks, associated with an event type "communication lost with server." The system may analyze event attributes and/or topology characteristics associated with the candidate runbooks to identify a subset of candidate runbooks for which the operation execution engine 712 may execute one or more operations. The system analyzes the results generated by the one or more operations executed by the operation execution engine 712 to identify which runbooks, from among the subset of runbooks, to display on a runbook selection interface as a recommendation to remediate the detected event.

Figure 8A:
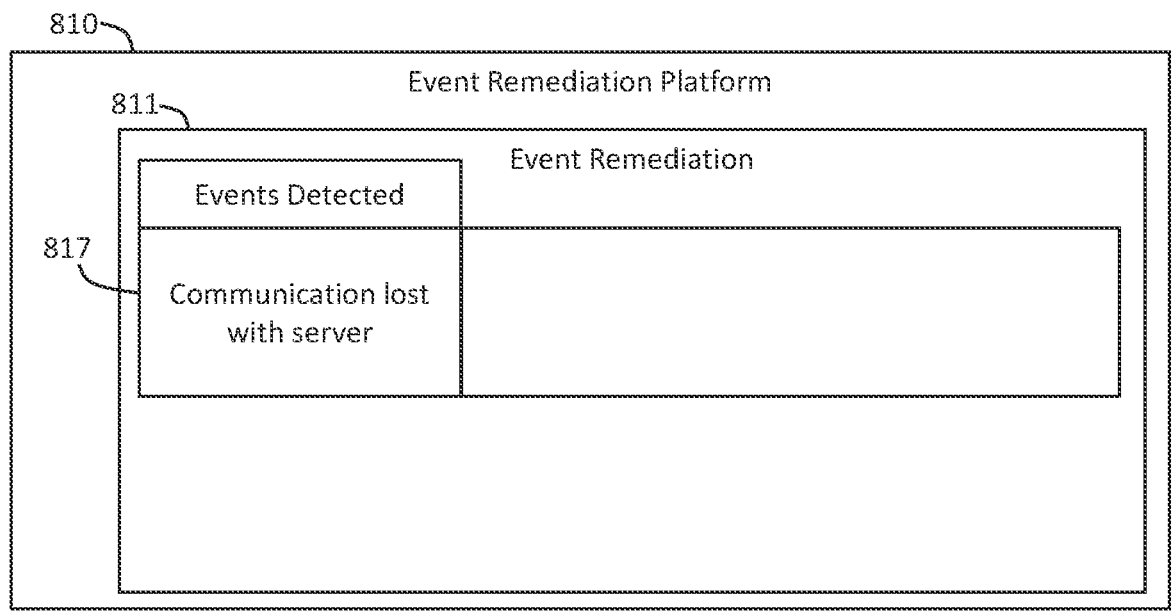
FIGS. 8A and 8B illustrate an example embodiment of a graphical user interface (GUI)
Figure 8B:
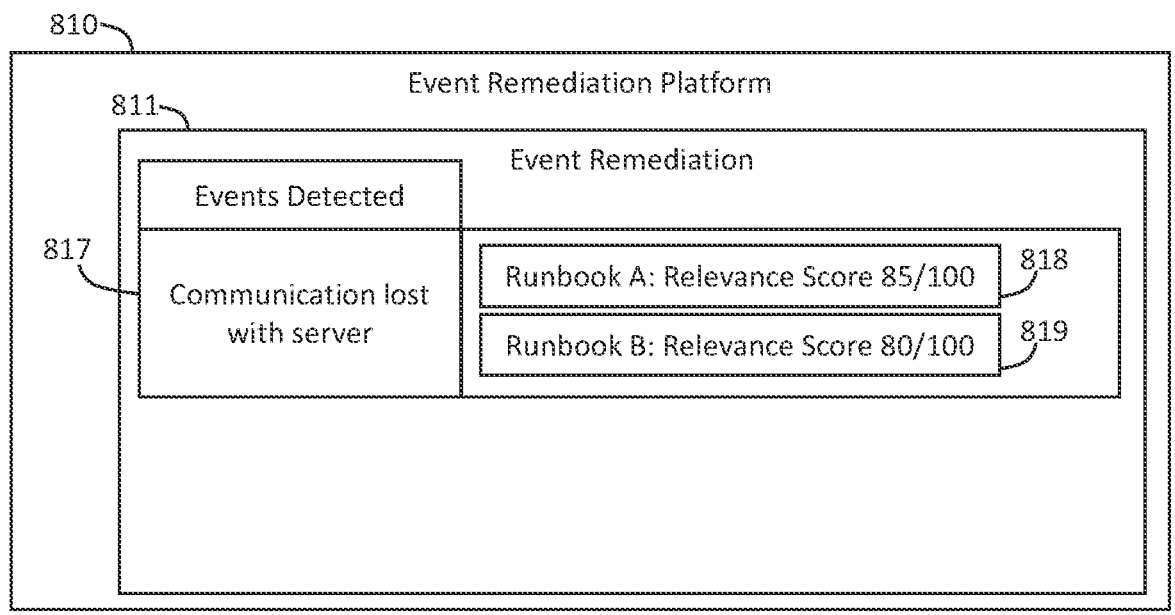

FIGS. 8A and 8B illustrate a detailed example of a graphical user interface (GUI) for presenting one or more runbooks as recommendations for remediating an event. Components and/or operations described below should be understood as one specific example which may not be applicable to certain embodiments. Accordingly, components and/or operations described below should not be construed as limiting the scope of any of the claims.

In the example embodiment illustrated in FIG. 8A, the event remediation platform 810 includes a graphical user interface (GUI) 811 displaying an event 817 "communication lost with server." The event may be displayed based on detecting metric values, from a system monitoring platform, outside a threshold range of metric values. Alternatively, the event may be displayed based on a user generating a "ticket." For example, a user may experience a loss of communication with a server and may generate the ticket to report the event. While one event 817 is illustrated in FIG. 8A, the GUI may display any number of detected events.

Based on a selection, by a user, of the user interface element associated with the event 817, the event remediation engine initiates a process to select one or more runbooks to recommend for remediating the event. In particular, the event remediation engine 810 identifies a set of candidate runbooks. The event remediation engine 810 executes one or more sub-operations associated with one or more steps of the candidate runbooks. Based on the results, the event remediation engine 810 determines whether to recommend the candidate runbooks to remediate the event.

As illustrated in FIG. 8B, based on identifying Runbook A 818 and Runbook B 819 as having relevancy scores that meet a relevancy criterion, the event remediation platform 810 displays interface elements 818 and 819 as recommendations for executing to remediate the identified event. A user may select an interface element 818 to display a set of steps for remediating the identified event.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, multiple tenants may share the database.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 9:
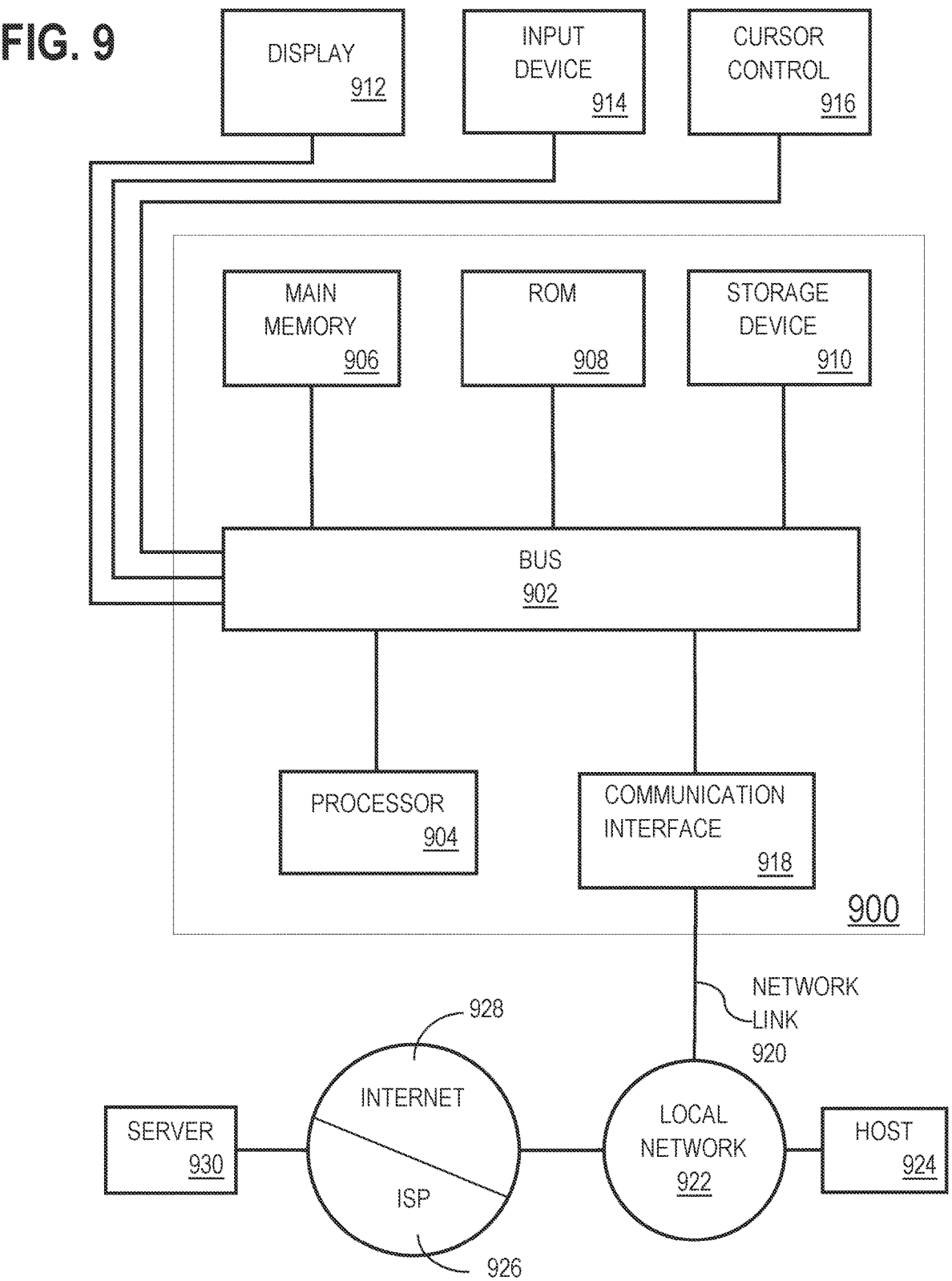
FIG. 9 shows a block diagram that illustrates a computer system in accordance with one or more embodiments.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing diverse types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors cause performance of operations comprising:
    detecting an occurrence of an event to be remediated, the event corresponding to a target component;
    obtaining first topology data indicating a first set of one or more topological relationships between the target component and a first set of one or more other components;
    obtaining second topology data indicating a second set of one or more topological relationships between a second component and a second set of one or more other components;
    identifying a runbook previously executed in relation to the second component, the runbook defining a list of independently executable operations; and
    based on determining the first set of one or more topological relationships and the second set of one or more topological relationships meet a similarity criterion, presenting the runbook as a recommendation for remediating the event,
    wherein determining the first set of one or more topological relationships and the second set of one or more topological relationships meet a similarity criterion comprises:
        determining at least one of (a) a percentage of components that is the same in the first topology data and the second topology data, or (b) a percentage of communication channels that is the same in the first topology data and the second topology data, meets a threshold percentage.

2. The non-transitory computer readable medium of claim 1, wherein the first topology data and the second topology data are obtained responsive to:
    presenting a runbook selection interface including functionality for selecting at least one of a plurality of runbooks for execution; and
    selecting the event to be remediated.

3. The non-transitory computer readable medium of claim 1, wherein the operations further comprise:
    collecting metadata associated with the event,
    wherein the first topology data is obtained based on the metadata associated with the event.

4. The non-transitory computer readable medium of claim 1, wherein determining the first set of one or more topological relationships and the second set of one or more topological relationships meet a similarity criterion comprises:
    identifying a first set of components in the first topology data that have a particular topological relationship with the target component; and
    determining that a second set of components in the second topology data has the same particular topological relationship with a particular component in the second topology data.

5. The non-transitory computer readable medium of claim 1, wherein the first set of one or more topological relationships includes being communicatively connected to the target component within a predefined degree of separation, the predefined degree of separation defined by a number of intervening components along a communications path between a particular component and the target component.

6. The non-transitory computer readable medium of claim 1, wherein the second topology data is obtained from a repository of a plurality of topologies, each topology comprising a plurality of components and connections among the plurality of components,
    wherein each of the plurality of topologies is associated in the repository with at least one runbook previously executed in relation at least one component in a respective topology.

7. The non-transitory computer readable medium of claim 1, wherein presenting the runbook as the recommendation for remediating the event is further based on:
    identifying a particular event to which the runbook was previously applied to remediate the particular event; and
    determining that the event associated with the first topology data and the particular event meet a threshold level of similarity to each other.

8. The non-transitory computer readable medium of claim 1, wherein the runbook includes at least one user-generated data label specifying at least one topological relationship in the second set of one or more topological relationships.

9. A method comprising:
    detecting an occurrence of an event to be remediated, the event corresponding to a target component;
    obtaining first topology data indicating a first set of one or more topological relationships between the target component and a first set of one or more other components;
    obtaining second topology data indicating a second set of one or more topological relationships between a second component and a second set of one or more other components;

identifying a runbook previously executed in relation to the second component, the runbook defining a list of independently executable operations; and based on determining the first set of one or more topological relationships and the second set of one or more topological relationships meet a similarity criterion, presenting the runbook as a recommendation for remediating the event, wherein determining the first set of one or more topological relationships and the second set of one or more topological relationships meet a similarity criterion comprises:

determining at least one of (a) a percentage of components that is the same in the first topology data and the second topology data, or (b) a percentage of communication channels that is the same in the first topology data and the second topology data, meets a threshold percentage.

10. The method of claim 9, wherein the first topology data and the second topology data are obtained responsive to:

presenting a runbook selection interface including functionality for selecting at least one of a plurality of runbooks for execution; and selecting the event to be remediated.

11. The method of claim 9, wherein the operations further comprise:

collecting metadata associated with the event, wherein the first topology data is obtained based on the metadata associated with the event.

12. The method of claim 9, wherein determining the first set of one or more topological relationships and the second set of one or more topological relationships meet a similarity criterion comprises:

identifying a first set of components in the first topology data that have a particular topological relationship with the target component; and determining that a second set of components in the second topology data has the same particular topological relationship with a particular component in the second topology data.

13. The method of claim 9, wherein the first set of one or more topological relationships includes being communicatively connected to the target component within a predefined degree of separation, the predefined degree of separation defined by a number of intervening components along a communications path between a particular component and the target component.

14. The method of claim 9, wherein the second topology data is obtained from a repository of a plurality of topologies, each topology comprising a plurality of components and connections among the plurality of components, wherein each of the plurality of topologies is associated in the repository with at least one runbook previously executed in relation at least one component in a respective topology.

15. The method of claim 9, wherein presenting the runbook as the recommendation for remediating the event is further based on:

identifying a particular event to which the runbook was previously applied to remediate the particular event; and determining that the event associated with the first topology data and the particular event meet a threshold level of similarity to each other.

16. The method of claim 9, wherein the runbook includes at least one user-generated data label specifying at least one topological relationship in the second set of one or more topological relationships.

17. A system, comprising:

one or more processors; and memory storing instructions that, when executed by the one or more processors, cause the system to perform operations comprising:

detecting an occurrence of an event to be remediated, the event corresponding to a target component;

obtaining first topology data indicating a first set of one or more topological relationships between the target component and a first set of one or more other components;

obtaining second topology data indicating a second set of one or more topological relationships between a second component and a second set of one or more other components;

identifying a runbook previously executed in relation to the second component, the runbook defining a list of independently executable operations; and based on determining the first set of one or more topological relationships and the second set of one or more topological relationships meet a similarity criterion, presenting the runbook as a recommendation for remediating the event, wherein determining the first set of one or more topological relationships and the second set of one or more topological relationships meet a similarity criterion comprises:

determining at least one of (a) a percentage of components that is the same in the first topology data and the second topology data, or (b) a percentage of communication channels that is the same in the first topology data and the second topology data, meets a threshold percentage.

18. The system of claim 17, wherein the first topology data and the second topology data are obtained responsive to:

presenting a runbook selection interface including functionality for selecting at least one of a plurality of runbooks for execution; and selecting the event to be remediated.

19. The system of claim 17, wherein the operations further comprise:

collecting metadata associated with the event, wherein the first topology data is obtained based on the metadata associated with the event.

20. The system of claim 17, wherein determining the first set of one or more topological relationships and the second set of one or more topological relationships meet a similarity criterion comprises:

identifying a first set of components in the first topology data that have a particular topological relationship with the target component; and determining that a second set of components in the second topology data has the same particular topological relationship with a particular component in the second topology data.

21. A non-transitory computer readable medium comprising instructions which, when executed by one or more hardware processors cause performance of operations comprising:

detecting an occurrence of an event to be remediated, the event corresponding to a target component;

obtaining first topology data indicating a first set of one or more topological relationships between the target component and a first set of one or more other components;

obtaining second topology data indicating a second set of one or more topological relationships between a second component and a second set of one or more other components;

identifying a runbook previously executed in relation to the second component, the runbook defining a list of independently executable operations; and based on determining the first set of one or more topological relationships and the second set of one or more topological relationships meet a similarity criterion, presenting the runbook as a recommendation for remediating the event, wherein the first set of one or more topological relationships includes being communicatively connected to the target component within a predefined degree of separation, the predefined degree of separation defined by a number of intervening components along a communications path between a particular component and the target component.

\* \* \* \* \*